United States Patent [19]

Itoh et al.

[11] Patent Number: 5,795,374

[45] Date of Patent: Aug. 18, 1998

[54] COATING COMPOSITION

[75] Inventors: Masayasu Itoh; Shigeo Fukuda; Yoshihisa Kawakami; Yoshiro Matsubara; Yasushi Kawamura; Shigeru Masuoka; Yoshihiro Honda, all of Kanagawa, Japan

[73] Assignee: NOF Corporation, Tokyo, Japan

[21] Appl. No.: 839,702

[22] Filed: Apr. 15, 1997

[30] Foreign Application Priority Data

Apr. 17, 1996 [JP] Japan ................................ 8-095028

[51] Int. Cl.$^6$ .......................... C09D 5/16; A01N 55/10
[52] U.S. Cl. ................. 106/16; 106/18.36; 106/218; 106/236; 106/241; 424/78.09; 424/630; 424/632; 424/634; 424/635; 424/637; 424/638; 424/641; 424/646; 514/63; 514/494; 514/499; 514/500; 514/501; 523/122; 523/177
[58] Field of Search ..................... 106/16, 18.36, 106/218, 236, 241; 424/78.09, 630, 632, 634, 635, 637, 638, 641, 646; 523/122, 177; 514/63, 494, 499, 500, 501

[56] References Cited

U.S. PATENT DOCUMENTS

| 4,593,055 | 6/1986 | Gitlitz et al. ........................ 106/16 |
| 4,594,365 | 6/1986 | Russell et al. ...................... 106/15.05 |
| 4,687,792 | 8/1987 | Russell et al. ...................... 106/18.23 |
| 4,898,895 | 2/1990 | Masuoka et al. .................... 106/16 |
| 5,332,431 | 7/1994 | Yokoi et al. ........................ 106/18.32 |
| 5,436,284 | 7/1995 | Honda et al. ....................... 106/15.05 |
| 5,439,512 | 8/1995 | Kamijima et al. ................... 106/18.31 |

FOREIGN PATENT DOCUMENTS

| 0608132A1 | 7/1994 | European Pat. Off. . |
| 50-135125 | 10/1975 | Japan . |
| 6-208456 | 2/1985 | Japan . |
| 63-215780 | 9/1988 | Japan . |
| WO8402915 | 8/1984 | WIPO . |

OTHER PUBLICATIONS

Chemical Abstract No. 110:25519 which is an abstract of Japanese Patent Specification No. 63-215780 (Sep. 1988).
Chemical Abstract No. 123:231495 which is an abstract of Japanese Patent Specification No. 07-090202 (Apr. 1995).
Chemical Abstract No. 125:145297 which is an abstract of Japanese Patent Specification No. 08-134381 (May 1996).
JAPIO Abstract No. JP362283167A which is an abstract of Japanese Patent Specification No. 62-283167 (Dec. 1987).
JAPIO Abstract No. JP363057675A which is an abstract of Japanese Patent Specification No. 63-057675 (Mar. 1988).
JAPIO Abstract No. JP363057676A which is an abstract of Japanese Patent Specification No. 63-057676 (Mar. 1988).
JAPIO Abstract No. JP363110268A which is an abstract of Japanese Patent Specification No. 63-110268 (May 1988).
JAPIO Abstract No. JP364001773A which is an abstract of Japanese Patent Specification No. 64-001773 (Jan. 1989).
JAPIO Abstract No. JP401009278A which is an abstract of Japanese Patent Specification No. 01-009278 (Jan. 1989).
JAPIO Abstract No. JP401121372A which is an abstract of Japanese Patent Specification No. 01-121372 (May 1989).
JAPIO Abstract No. JP401121374A which is an abstract of Japanese Patent Specification No. 01-121374 (May 1989).
JAPIO Abstract No. JP401146969A which is an abstract of Japanese Patent Specification No. 01-146969 (Jun. 1989).
JAPIO Abstract No. JP403031372A which is an abstract of Japanese Patent Specification No. 03-031372 (Feb. 1991).
JAPIO Abstract No. JP403031373A which is an abstract of Japanese Patent Specification No. 03-031373 (Feb. 1991).
JAPIO Abstract No. JP405112739A which is an abstract of Japanese Patent Specification No. 05-112739 (May 1993).
JAPIO Abstract No. JP406016973A which is an abstract of Japanese Patent Specification No. 06-016973 (Jan. 1994).
JAPIO Abstract No. JP406107970A which is an abstract of Japanese Patent Specification No. 06-107970 (Apr. 1994).
JAPIO Abstract No. JP407102193A which is an abstract of Japanese Patent Specification No. 07-102193 (Apr. 1995).
WPIDS Abstract No. 94-238989 which is an abstract of Japanese Patent Specification No. 06-172683 (Jun. 1994).
WPIDS Abstract No. 95-243806 which is an abstract of Japanese Patent Specification No. 07-150076 (Jun. 1995).
WPIDS Abstract No. 96-094433 which is an abstract of Japanese Patent Specification No. 08-003484 (Jan. 1996).
WPIDS Abstract No. 96-261604 which is an abstract of European Patent Specification No. 071457 (Jun. 1996).
WPIDS Abstract No. 97-034336 which is an abstract of PCT International Patent Specification No. 96/38508 (Feb. 1997).
Patent Abstracts of Japan vo. 009, No. 145 (C-287), 20 Jun. 1985 & JP 60 028456 A (Nippon Yushi KK), 13 Feb. 1985 *abstract*.

*Primary Examiner*—Anthony Green
*Attorney, Agent, or Firm*—Sughrue, Mion, Zinn, Macpeak & Seas, PLLC

[57] ABSTRACT

A coating composition comprising a rosin compound, a polymer containing organosilyl ester groups, and an antifoulant as essential components is disclosed. This rosin-based coating composition gives a coating film which forms no residue layer on the surface thereof over long-term immersion, is hence free from physical defects such as cracks and peeling and capable of maintaining a sufficiently high rate of film erosion and preventing the attachment of marine organisms over a long period of time has satisfactory suitability for recoating, and has the satisfactory ability to prevent marine-organism attachment over the out-fitting period.

16 Claims, No Drawings

COATING COMPOSITION

FIELD OF THE INVENTION

The present invention relates to a coating composition for use in preventing the attachment of organisms to the surfaces of structures submerged in seawater.

BACKGROUND OF THE INVENTION

The surfaces of structures submerged in seawater such as ship bottoms, buoys, fishing nets (e.g., fixed nets and farming nets), underwater antifouling films, and various draft and drain pipes for cooling undergo various troubles as a result of the attachment of barnacles, mytilids, serpulas, algae, and the like. It is well known to coat submerged structure surfaces with paints capable of preventing the attachment of such marine organisms in order to prevent fouling by these organisms. The resins currently used in paints for the prevention of marine-organism attachment are roughly divided into hydrolyzable polymer type and rosin type.

The most typical hydrolyzable polymers are organotin polymers. The paints based on an organotin polymer function as follows. The coating film formed therefrom erodes as a result of the hydrolysis in seawater of organotin groups bonded to the polymer, whereby the coating film retains its surface activity. The organotin compound resulting from the hydrolysis also functions as an antifoulant. The coating film is thus capable of preventing the attachment of marine organisms over a long period of time. However, since organotin compounds tend to accumulate in the environment, use thereof is restricted from the standpoint of avoiding environmental pollution. Many proposals have been made on hydrolyzable polymers as substitutes for such organotin polymers in, e.g., JP-A-60-500452 (corresponding to WO 84/02915, PCT/US84/00068), JP-A-63-215780, and JP-A-7-102193 (corresponding to U.S. Pat. No. 5,436,284). (The term "JP-A" as used herein means an "unexamined published Japanese patent application.")

On the other hand, the paints based on a rosin are advantageous in that since the rosin is slightly soluble in alkali solutions and dissolves into seawater, which is weakly alkaline (pH≈7.8–8.2) (solubility in seawater with a pH of 8.1:8.6×10$^{-5}$ mol/l), an antifoulant can be effectively and gradually released into seawater. Due to their slight solubility in seawater, rosins are extensively used in antifouling paints for the prevention of marine-organism attachment. Methods of use thereof are described in many publications including, e.g., "Shikizai Kōgaku Handobukk (Colorant Engineering Handbook)" (pp. 821-, edited by the Colorant Society) and "Senpaku No Tosō To Toryō (Coating and Paints for Ships)" (pp. 70-, written by Manabu Nakao, the Ship Technology Society).

However, rosins themselves are physically brittle (have considerably poor film-forming ability due to their low molecular weights) and should be used as blends with other synthetic resins or the like in order to compensate for the brittleness. The blending ingredients used for compensating for the brittleness should be polymers having satisfactory compatibility with rosins. If a rosin is blended with a polymer poorly compatible therewith, the rosin and the polymer separate from each other and the resulting rosin phase exhibits its physical brittleness.

With respect to the blending of rosins with other polymers, proposals were made in JP-A-50-135125. Further, it was reported in JP-A-60-28456 that use of a blending polymer having satisfactory compatibility facilitates the control of coating film erodibility (self-polishing properties).

However, it was found that even when a blend of a rosin with a polymer satisfactorily compatible therewith is used in an antifouling paint, the coating film formed from the paint comes to have drawbacks after long-term immersion, such as a decrease in coating film erodibility, generation of physical defects in the coating film, and a decrease in the prevention of marine-organism attachment, although satisfactory in the initial properties thereof. Further, since ships, in particular, are recoated after a certain period (about from one to three years) of service, the old coating films are required to have suitability for recoating, i.e., the ability to be coated with a fresh paint. However, coating films formed from the prior art antifouling paints containing a blend of a rosin and a polymer compatible therewith were found to be unsuitable for this recoating.

These drawbacks and defect are attributable to the formation of a surface residue layer resulting from the dissolution (leaching) of the antifoulant together with the rosin on the coating film surface in preference to the rosin-compatible polymer due to the solubility in seawater of the polymer itself, which is lower than that of the rosin or is almost nil.

Blending polymers are required to have a higher film-forming ability than rosins, i.e., to have a higher molecular weight than rosins, because they are used in order to compensate for the physical brittleness of rosins. This difference in molecular weight between rosins and blending polymers results in a difference in solubility therebetween. Since the thickness of the residue layer increases with immersion time, this results in a decrease in coating film erodibility and generation of physical coating film defects due to internal cohesion within the residue layer. As a result of these, the effect of preventing marine-organism attachment is lessened and suitability for recoating is reduced.

As described above, despite the slight solubility of rosins in seawater which property is a performance rendering the rosins exceedingly suitable for use in paints for marine-organism attachment, there has so far been no coating composition which continuously takes advantage of that performance over a long period of time.

Furthermore, the hydrolyzable polymers proposed as substitutes for organotin polymers in JP-B-5-32433 (corresponding to JP-A-60-500452) and JP-A-63-215780, which have organosilicon groups as hydrolyzable groups, were found to have defects, for example, that the coating films comprising these polymers are unsuitable for the prevention of marine-organism attachment because they do not dissolve into seawater or they peel off during immersion in seawater. (The term "JP-B" as used herein means an "examined Japanese patent publication.") The present inventors made intensive studies in order to eliminate those defects and, as a result, found that the defects could be eliminated not by merely incorporating organosilyl groups but with the polymers described in JP-A-7-102193 (corresponding to U.S. Pat. No. 5,436,284).

However, an investigation made thereafter revealed that even the polymers proposed in the reference cited just above are unsatisfactory not only in performances after long-term immersion in seawater, in particular suitability for recoating, but also in the prevention of marine-organism attachment over a period corresponding to the out-fitting period, which performance is required for out-fitting.

The term "out-fitting period" means the period in ship construction in which a hull constructed within a dock is floated on the seawater outside the dock and equipped for sailing. This period is usually about 3 months.

Since the hull is exposed in an anchored state to the sea near the dockyard (i.e., exposed to a sea area where severe fouling by organisms occurs unlike in the ocean) during the out-fitting period, the antifouling paint to be used for the out-fitting period is required to have a higher-than-ordinary degree of performance in the prevention of marine-organism attachment over the out-fitting period.

The ship which has been out-fitted is commissioned in service as it is or after being docked again and finished. If the attachment of organisms occurs during the out-fitting period, the ship having the adherent organisms cannot be commissioned in service because the ship has a reduced fuel efficiency from-the initial stage of service. In the case of redocking the ship, it is necessary to remove the adherent organisms prior to service. If use of an antifouling paint has resulted in such troubles, the paint intended for the prevention of marine-organism attachment was utterly ineffective in performing its function, namely the application thereof was equal to nonuse thereof.

The present inventors devised a test method for evaluating the ability to prevent marine-organism attachment over the out-fitting period. Specifically, this improved test was conducted in the seawater of Owase bay, Mie, Japan, where fouling by marine organisms is severer than in Aioi Bay, Hyogo, Japan, a sea area usually used by the present inventors for evaluating the ability to prevent marine-organism attachment, for three months of from July to September, 1996 in such a manner that test pieces were immersed while being kept horizontal so as to be more influenced by sunlight, in contrast to the ordinary immersion in which test pieces are kept perpendicular to the water surface. Thus, the immersion test was initiated in summer, when fouling by organisms is severest (since an antifouling agent for preventing marine-organism attachment does not come to be leached immediately upon immersion but comes to be leached after a certain period, the possibility of organism attachment is high immediately after initiation of immersion when the test pieces are immersed in the season when fouling by organisms is severe). As a result of evaluation by this test method, the polymers described in JP-A-7-102193 (corresponding to U.S. Pat. No. 5,436,284) were found to be unsatisfactory in the ability to prevent marine-organism attachment over the out-fitting period.

SUMMARY OF THE INVENTION

An object of the present invention is to develop a rosin-based coating composition giving a coating film which forms no residue layer on the surface thereof over long-term immersion, is hence free from physical defects such as cracks and peeling and capable of maintaining a sufficiently high rate of coating film erosion and preventing the attachment of marine organisms over a long period of time, and has satisfactory suitability for recoating and the satisfactory ability to prevent marine-organism attachment over the out-fitting period.

The present inventors directed attention to the following points in order to develop the desired coating composition. For developing the desired coating composition, it is necessary to enable the formation of a coating film which forms no residue layer on the surface thereof. In order for a coating film to satisfy this requirement, the coating film should contain a rosin-compatible polymer which comes to have enhanced solubility in seawater after immersion therein. Only polymers which undergo a chemical change upon immersion in seawater can perform such a function. Namely, such polymers undergoing a-chemical change can have good compatibility with rosin resins before immersion in seawater and become hydrophilic only at the coating film surface after immersion in seawater to thereby retain a satisfactory dissolution rate.

The present inventors directed attention to, as a blending polymer, a polymer containing a carboxylic acid protected by an organosilyl group. This polymer is compatible with rosins (lowly polar) due to the low polarity of the organosilyl group and, after immersion in seawater, undergoes a chemical change due to the hydrolyzability of the organosilyl group. Thus, the seawater dissolution characteristics of the polymer dramatically change from insoluble to soluble. Organotin polymers having similar hydrolyzability are poorly compatible with rosins because of their higher polarity than the silylated polymer and are hence unable to perform the function of the silylated polymer. The crucially important properties required of a polymer for use as blends with rosins are low polarity and hydrolyzability in seawater.

As a result of intensive studies made by the present inventors on the above points, it has been found that the problems of prior art techniques can be completely eliminated by using a rosin compound such as a rosin or a derivative thereof in combination with a polymer containing organosilyl ester groups in which the organosilyl groups function as hydrolysis sites and with an antifoulant. Namely, they have succeeded in developing a rosin-based coating composition giving a coating film which forms no residue layer on the surface thereof over long-term immersion, is hence free from physical defects such as cracks and peeling and capable of maintaining a sufficiently high rate of coating film erosion and preventing the attachment of marine organisms over long, and has satisfactory suitability for recoating and the satisfactory ability to prevent marine-organism attachment over the out-fitting period.

The present invention provides a coating composition comprising, as essential components, (A) at least one rosin compound selected from rosins, rosin derivatives, and rosin metal salts, (B) at least one polymer containing organosilyl ester groups which comprises a polymer of at least one of monomers M represented by the formula

wherein $R_1$ to $R^3$ may be the same or different and each represents an alkyl group or an aryl group, and X represents an acryloyloxy group, a methacryloyloxy group,, a maleinoyloxy group, a fumaroyloxy group, an itaconoyloxy group, or a citraconoyloxy group and/or a polymer of at least one of said monomers M and at least of polymerizable monomers other than said monomers M, and (C) an antifoulant.

DETAILED DESCRIPTION OF THE INVENTION

The rosin compound of ingredient A used as an essential component in the present invention is at least one selected from rosins,.rosin derivatives, and rosin metal salts. Examples of the rosins include tall rosin, gum rosin, and wood rosin. Examples of the rosin derivatives include hydrogenated rosins, modified rosins obtained by reacting rosins with maleic anhydride, formylated rosins, and polymerized rosins. Examples of the rosin metal salts include zinc rosinates, calcium rosinates, copper rosinates, magnesium rosinates, and products of the reaction of rosins with compounds of other metals.

At least one selected from such rosin compounds is used in the present invention in such an amount that the proportion of this rosin compound to the polymer containing organosilyl ester groups of ingredient B is usually from 1/99 to 99/1, preferably from 5/95 to 95/5, by weight on a solid basis. If the amount of ingredient A is too small (i.e., the ratio of ingredient A to ingredient B is less than 1:99), the effect of preventing the attachment of marine organisms, in particular the effect of preventing marine-organism attachment over-the out-fitting period, is not expected. If the amount thereof is too large (i.e., the ratio of ingredient A to ingredient B is larger than 99:1), the coating composition has reduced film-forming ability and gives a coating film which is apt to develop defects such as cracks and peeling and hence be less effective in the prevention of marine-organism attachment.

The polymer containing organosilyl ester groups of ingredient B used as another essential component in the coating composition of the present invention comprises a polymer of at least one of monomers M, which are represented by formula (1) described above, and/or a polymer of at least one of monomers M and at least one of polymerizable monomers other than monomers M.

As apparent from formula (1), monomers M each has a molecular structure comprising an acryloyloxy group, a methacryloyloxy group, a maleinoyloxy group [mostly a maleinoyloxy group monoesterified with an alkyl (having 1 to 6 carbon atoms)], a fumaroyloxy group [mostly a fumaroyloxy group monoesterified with an alkyl (having 1 to 6 carbon atoms)], an itaconoyloxy group [mostly an itaconoyloxy group monoesterified with an alkyl (having 1 to 6 carbon atoms)], or a citraconoyloxy group [mostly a citraconoyloxy group monoesterified with an alkyl (having 1 to 6 carbon atoms)] as an unsaturated group (X) and a triorganosilyl group.

In the triorganosilyl group, the three alkyl or aryl groups ($R_1$ to $R^3$) may be the same or different. Examples thereof include linear or branched alkyl groups having up to 20 carbon atoms, such as methyl, ethyl, propyl, and butyl; cycloalkyl groups such as cyclohexyl and substituted cyclohexyls; and aryl groups and substituted aryl groups. Examples of the substituted aryl groups include aryl groups substituted with at least one substituent selected from halogens, alkyl groups having 1 to about 8 carbon atoms, acyl groups, a nitro group, an amino group, and the like.

Of such monomers M, those having a (meth)acryloyloxy group in the molecule include trimethylsilyl (meth)acrylate, triethylsilyl (meth)acrylate, tri-n-propylsilyl (meth)acrylate, triisopropylsilyl (meth)acrylate, tri-n-butylsilyl (meth)acrylate, triisobutylsilyl (meth)acrylate, tri-s-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, and tribenzylsilyl (meth)acrylate.

Other examples of the monomers M having a (meth)acryloyloxy group in the molecule include ethyldimethylsilyl (meth)acrylate, n-butyldimethylsilyl (meth)acrylate, diisopropyl-n-butylsilyl (meth)acrylate, n-octyldi-n-butylsilyl (meth)acrylate, diisopropylstearylsilyl (meth)acrylate, dicyclohexylphenylsilyl (meth)acrylate, t-butyldiphenylsilyl (meth)acrylate, lauryldiphenylsilyl (meth)acrylate, and t-butyl-m-nitrophenylmethylsilyl (meth)acrylate.

Examples of the monomers M having a maleinoyloxy group in the molecule include trimethylsilyl methyl maleate, triethylsilyl ethyl maleate, tri-n-propylsilyl n-propyl maleate, tri-n-butylsilyl n-butyl maleate, tri-n-amylsilyl n-amyl maleate, tri-n-hexyloctylsilyl maleate, tri-n-octylsilyl dodecyl maleate, tri-n-dodecylsilyl methyl maleate, triphenylsilyl methyl maleate, tri-p-tolylsilyl ethyl maleate, triisopropylsilyl isoamyl maleate, triIsobutylsilyl phenyl maleate, t-butyldimethylsilyl methyl maleate, t-butyldiphenylsilyl methyl maleate, and n-octyldi-n-butylsilyl methyl maleate.

Examples of the monomers M having a fumaroyloxy group in the molecule include trimethylsilyl methyl fumarate, triethylsilyl ethyl fumarate, tri-n-propylsilyl-n-propyl fumarate, tri-n-butylsilyl-n-butyl fumarate, tri-n-amylsilyl-n-amyl fumarate, tri-n-hexylsilyl-n-hexyl fumarate, tri-n-octylsilyl dodecyl fumarate, tri-n-dodecylsilyl methyl fumarate, triphenylsilyl methyl fumarate, tri-p-methylphenylsilyl methyl fumarate, triisopropylsilyl methyl fumarate, triisobutylsilyl methyl fumarate, tri-2-chloroisopropylsilyl methyl fumarate, tri-t-butylsilyl methyl fumarate, ethyldimethylsilyl methyl fumarate, n-butyldimethylsilyl methyl fumarate, and n-octyldi-n-butylsilyl methyl fumarate.

Examples of the monomers M having an itaconoyloxy group in the molecule include trimethylsilyl methyl itaconate, triethylsilyl ethyl itaconate, tri-n-propylsilyl-n-propyl itaconate, tri-n-butylsilyl-n-butyl itaconate, tri-n-amylsilyl-n-amyl itaconate, tri-n-hexylsilyl-n-hexyl itaconate, tri-n-octylsilyl dodecyl itaconate, tri-n-dodecylsilyl methyl itaconate, triphenylsilyl methyl itaconate, tri-p-fluorophenylsilyl methyl itaconate, triisopropylsilyl methyl itaconate, triisobutylsilyl methyl itaconate, tri-2-cyanoisopropylsilyl methyl itaconate, tri-t-butylsilyl methyl itaconate, ethyldimethylsilyl methyl itaconate, n-butyldimethylsilyl methyl itaconate, and n-octyldi-n-butylsilyl methyl itaconate.

Examples of the monomers M having a citraconoyloxy group in the molecule include trimethylsilyl methyl citraconate, triethylsilyl ethyl citraconate, tri-n-propylsilyl-n-propyl citraconate, tri-n-butylsilyl-n-butyl citraconate, tri-n-amylsilyl-n-amyl citraconate, tri-n-hexylsilyl-n-hexyl citraconate, tri-n-octylsilyl dodecyl citraconate, tri-n-dodecylsilyl methyl citraconate, triphenylsilyl methyl citraconate, tri-p-hydroxyphenylsilyl methyl citraconate, triisopropylsilyl methyl citraconate, triisobutylsilyl methyl citraconate, tri-2-bromoisopropylsilyl methyl citraconate, tri-t-butylsilyl methyl citraconate, ethyldimethylsilyl methyl citraconate, n-butyldimethylsilyl methyl citraconate, and n-octyldi-n-butylsilyl methyl citraconate.

The polymerizable monomers other than monomers M are monomers copolymerizable with monomers M. Examples thereof include acrylic acid and acrylic esters such as methyl acrylate, ethyl acrylate, n-butyl acrylate, t-butyl acrylate, s-butyl acrylate, 2-ethylhexyl acrylate, cyclohexyl acrylate, 2-hydroxyethyl acrylate, 2-hydroxypropyl acrylate, glycidyl acrylate, 2-methoxyethyl acrylate, and 2-ethoxyethyl acrylate; and methacrylic acid and methacrylic esters such as methyl methacrylate, n-butyl methacrylate, t-butyl methacrylate, s-butyl methacrylate, 2-ethylhexyl methacrylate, cyclohexyl methacrylate, 2-hydroxyethyl methacrylate, 2-hydroxypropyl methacrylate, glycidyl methacrylate, 2-methoxyethyl methacrylate, and 2-ethoxyethyl methacrylate.

Other examples of the polymerizable monomers include vinyl esters such as vinyl acetate, vinyl propionate, vinyl butyrate, vinyl benzoate, and VeoVa 9 and VeoVa 10 (trade names; manufactured by Showa Shell Kagaku K. K., Japan), maleic esters such as dimethyl maleate, diethyl maleate, di-n-propyl maleate, diisopropyl maleate, and di-2-methoxyethyl maleate, fumaric esters such as dimethyl fumarate, diethyl fumarate, di-n-propyl fumarate, diisopropyl fumarate, and di-2-methoxyethyl fumarate, crotonic esters, itaconic esters, citraconic esters, styrene, vinyltoluene, o-methylstyrene, and acrylonitrile.

In producing the polymer containing organosilyl ester groups of ingredient B, the proportion of at least one of monomers M represented by formula (1) to at least one polymerizable monomer other than monomers M can be suitably determined according to the use of the coating composition. In general, however, the proportion of at least one of monomers M is preferably from 1 to 100% by weight and that of at least one other monomer is preferably from 99 to 0% by weight.

The polymer containing organosilyl ester groups of ingredient B can be obtained by polymerizing such a monomer mixture in the presence of a polymerization catalyst by any of various methods such as solution polymerization, bulk polymerization, emulsion polymerization, and suspension polymerization in an ordinary way. In preparing a coating composition using this polymer containing organosilyl ester groups of ingredient B, the polymer is preferably diluted with an organic solvent to give a polymer solution having an appropriate viscosity. From this standpoint, it is desirable to employ solution polymerization or bulk polymerization.

Examples of the polymerization catalyst include azo compounds such as azobisisobutyronitrile and triphenylmethylazobenzene and peroxides such as benzoyl peroxide, di-t-butyl peroxide, t-butyl peroxybenozate, and t-butyl peroxyisopropylcarbonate.

Examples of the organic solvent include aromatic hydrocarbons such as xylene and toluene, aliphatic hydrocarbons such as hexane and heptane, esters such as ethyl acetate and butyl acetate, alcohols such as isopropyl alcohol and butyl alcohol, ethers such as dioxane and diethyl ether, and ketones such as methyl ethyl ketone and methyl isobutyl ketone. These compounds are used alone or as a mixture of two or more thereof.

The thus-obtained polymer containing organosilyl ester groups of ingredient B desirably has a weight-average molecular weight of from 1,000 to 150,000. If the molecular weight thereof is too low (i.e., less than 1,000), it is difficult to form a normal film. If the molecular weight thereof is too high (i.e., more than 150,000), the coating composition obtained using the polymer has too high a viscosity and should hence be diluted with a thinner. Such a diluted coating composition is disadvantageous in that since the coating film thickness obtainable per coating operation is small, a larger number of coating operations are necessary. The solution of the polymer of ingredient B desirably has a viscosity of 150 P or lower at 25° C. For attaining such a viscosity, the polymer solution of ingredient B is desirably regulated so as to have a solid content of from 5 to 90% by weight, preferably from 15 to 85% by weight.

Ingredient (C) used as the last essential component in the coating composition-of the present invention is an antifoulant. This ingredient can be selected from a wide variety of conventionally known antifoulant compounds, which are roughly divided into three groups, i.e., inorganic compounds, organometallic compounds, and metal-free organic compounds. Examples of the inorganic compounds include copper powder, copper compounds such as cuprous oxide, cuprous thiocyanate, copper carbonate, copper chloride, and copper sulfate, zinc sulfate, zinc oxide, nickel sulfate, and copper-nickel alloys.

The organometallic compounds include, for example, organocopper compounds, organonickel compounds, and organozinc compounds. Also usable are maneb, manzeb, propineb, and the like. Examples of the organocopper compounds include oxine copper, copper nonylphenolsulfonate, copper bis(ethylenediamine) bis(dodecylbenzenesulfonate), copper acetate, copper naphthenates, copper bis(pentachlorophenolate)s, and copper pyrithione. Examples of the organonickel compounds include nickel acetate and nickel dimethyldithiocarbamate. Examples of the organozinc compounds include zinc acetate, zinc carbamate, zinc dimethyldithiocarbamate, zinc pyrithione, and zinc ethylenebisdithiocarbamate.

The metal-free organic compounds include, for example, N-trihalomethylthiophthalimides, dithiocarbamic acids, N-arylmaleimides, 3-(substituted amino)-1,3-thiazolidine-2,4-diones, dithiocyano compounds, triazine compounds, and others.

Examples of the N-trihalomethylthiophthalimides include N-trichloromethylthiophthalimide and N-fluorodichloromethylthiophthalimide. Examples of the dithiocarbamic acids include bis(dimethylthiocarbamoyl) disulfide, ammonium N-methyldithiocarbamate, ammonium ethylenebis(dithiocarbamate), and milneb.

Examples of the N-arylmaleimides include N-(2,4,6-trichlorophenyl)maleimide, N-4-tolylmaleimide, N-3-chlorophenylmaleimide, N-(4-n-butylphenyl)maleimide, N-(anilinophenyl)maleimide, and N-(2,3-xylyl)maleimide.

Examples of the 3-(substituted amino)-1,3-thiazolidine-2,4-diones include 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione, 3-(4-dimethylaminobenzylideneamino)-1,3-thiazolidine-2,4-dione, and 3-(2,4-dichlorobenzylideneamino)-1,3-thiazolidine-2,4-dione.

Examples of the dithiocyano compounds include dithiocyanomethane, dithiocyanoethane, and 2,5-dithiocyanothiophene. Examples of the triazine compounds include 2-methylthio-4-t-butylamino-6-cyclopropylamino-s-triazine.

Examples of the other metal-free organic compounds include 2,4,5,6-tetrachloroisophthalonitrile, N,N-dimethyl-N'-dichlorophenylurea, 4,5-dichloro-2-n-octylisothiazolin- 3-one, N,N-dimethyl-N'-phenyl(N-fluorodichloromethylthio)sulfamide, tetramethylthiuram disulfide, 3-iodo-2-propynylbutyl carbamate, 2-(methoxycarbonylamino)benzimidazole, 2,3,5,6-tetrachloro-4-(methylsulfonyl)pyridine, diiodomethyl p-tolyl sulfone, phenyl(bispyridine)bismuth dichloride, 2-(4-thiazolyl)benzimidazole, and pyridine triphenylborane.

At least one member selected from such various antifoulants is used in the present invention in an amount of usually from 0.1 to 80% by weight, preferably from 1 to 60% by weight, based on the total amount of all solid ingredients in the coating composition. If the amount of the antifoulant is too small (i.e., less than 0.1% by weight), an antifouling effect cannot be expected. If the amount thereof is too large (i.e., more than 80% by weight), the coating film formed from the coating composition is apt to develop defects such as cracks and peeling and be less effective in fouling prevention.

Various additive ingredients may be suitably incorporated into the coating composition of the present invention thus prepared. Examples of the optional ingredients include colorants such as pigments, e.g., red iron oxide, zinc oxide, and talc, and dyes, dehumidifiers, and additives ordinarily employed in paints, such as antisagging agents, plasticizers, e.g., chlorinated paraffins, dioctyl phthalate, and tricresyl phosphate, ultraviolet absorbers, e.g., benzophenone compounds and benzotriazole compounds, antiflooding agents, antisettling agents, antifoaming agents, silanols, polysiloxanes, and alkoxysilanes.

For forming an antifouling coating film from the coating composition of the present invention on the surface of a structure to be submerged in seawater, use may be made of a method in which the coating composition is applied on the surface in a suitable manner and the solvent is removed by evaporation at ordinary temperature or with heating. By this method, a dry coating film can be easily formed on the surface of the structure.

The present invention will be explained below in more detail by reference to Preparation Examples, Examples, and Comparative Examples. In these examples, all parts are by weight, and the molecular weights are given in terms of weight-average molecular weight measured by GPC (gel permeation chromatography) and calculated for standard polystyrene. Further, monomers $M_1$ to $M_9$, used in Preparation Examples, are monomers M represented by formula (1) wherein $R^1$ to $R^3$ and X are as shown in Table 1.

PREPARATION EXAMPLES 1 TO 4

According to the formulations shown in Table 2, a solvent a was introduced into a flask equipped with a stirrer and then heated to a given reaction temperature, and a mixture of a monomer M, one or more other monomers, and a polymerization catalyst a was added dropwise to the solvent in the flask with stirring over a period of 3 hours. After completion of the addition, the reaction mixture was kept at that temperature for 30 minutes. Subsequently, a mixture of a solvent b and a polymerization catalyst b was added dropwise thereto over a period of 20 minutes, and the resulting mixture was continuously stirred at that temperature for 2 hours to complete the polymerization reaction. A diluting solvent was finally added for dilution. Thus, polymer solutions $S_1$ to $S_4$ were obtained.

PREPARATION EXAMPLES 5 TO 8

Into a heat- and pressure-resistant vessel were introduced a monomer M, other monomers, and a polymerization catalyst according to the formulations shown in Table 3. The vessel was completely closed, and the contents were heated to a given reaction temperature with shaking and were then continuously shaken at that temperature for 8 hours to complete the reaction. Subsequently, a diluting solvent was added and the resulting mixture was shaken for 1 hour to dissolve the reaction product. Thus, polymer solutions $S_5$ to $S_8$ were obtained.

PREPARATION EXAMPLES 9 TO 16

Into a flask equipped with a stirrer were introduced a solvent, one or more monomers M, other monomers, and a polymerization catalyst according to the formulations shown in Tables 4 and 5. The contents were heated to a given temperature with stirring and then continuously stirred at that temperature for 6 hours to complete the reaction. Subsequently, the reaction mixture was diluted with a diluting solvent. Thus, polymer solutions $S_9$ to $S_{16}$ were obtained.

In Tables 2 to 5, "VeoVa 9" and "VeoVa 10" (trade names of Showa Shell Kagaku K. K.) each is a vinyl ester monomer, and "Perbutyl I" (registered trademark in Japan of NOF CORPORATION) is an organic peroxide.

TABLE 1

| | Organic Groups in Formula (1) | | | |
|---|---|---|---|---|
| | $R^1$ | $R^2$ | $R^3$ | X |
| Monomer $M_1$ | $CH_3$ | $CH_3$ | $t\text{-}C_4H_9$ | $CH_2\!=\!CHCOO$ |
| Monomer $M_2$ | $i\text{-}C_3H_7$ | $i\text{-}C_3H_7$ | $i\text{-}C_3H_7$ | $CH_2\!=\!CHCOO$ |
| Monomer $M_3$ | $n\text{-}C_4H_9$ | $n\text{-}C_4H_9$ | $n\text{-}C_4H_9$ | $CH_2\!=\!C(CH_3)COO$ |
| Monomer $M_4$ | $C_6H_5$ | $C_6H_5$ | $t\text{-}C_4H_9$ | $CH_2\!=\!C(CH_3)COO$ |
| Monomer $M_5$ | $i\text{-}C_3H_7$ | $i\text{-}C_3H_7$ | $i\text{-}C_3H_7$ | $CH_2\!=\!C(CH_3)COO$ |
| Monomer $M_6$ | $i\text{-}C_3H_7$ | $i\text{-}C_3H_7$ | $i\text{-}C_3H_7$ | $i\text{-}C_5H_{11}OOCCH\!=\!CHCOO$ (maleinoyloxy group) |
| Monomer $M_7$ | $C_6H_5$ | $C_6H_5$ | $t\text{-}C_4H_9$ | $CH_3OOCCH\!=\!CHCOO$ (fumaroyloxy group) |
| Monomer $M_8$ | $n\text{-}C_4H_9$ | $n\text{-}C_4H_9$ | $n\text{-}C_4H_9$ | $CH_2\!=\!C(CH_2COO\text{-}n\text{-}C_5H_{11})COO$ (itaconoyloxy group) |
| Monomer $M_9$ | $n\text{-}C_{20}H_{41}$ | $p\text{-}CH_3\!-\!C_6H_4$ | $m\text{-}Cl\!-\!C_6H_4$ | $n\text{-}C_6H_{13}OOCC(CH_3)\!=\!CHCOO$ (citratonoyloxy group) |

TABLE 2

| | | | Preparation Example | | | |
|---|---|---|---|---|---|---|
| | | | 1 | 2 | 3 | 4 |
| Formulation (parts) | Solvent a | xylene | 40 | 40 | — | 30 |
| | | butyl atetate | — | 10 | 40 | — |
| | Monomers M | monomer $M_1$ | 50 | — | — | — |
| | | monomer $M_2$ | — | 30 | — | — |
| | | monomer $M_3$ | — | — | 50 | — |
| | | monomer $M_4$ | — | — | — | 10 |
| | | monomer $M_5$ | — | — | — | — |
| | | monomer $M_6$ | — | — | — | — |
| | | monomer $M_7$ | — | — | — | — |
| | | monomer $M_8$ | — | — | — | — |
| | | monomer $M_9$ | — | — | — | — |
| | Other monomers | methyl methatrylate | — | 70 | 40 | — |
| | | n-butyl methacrylate | 30 | — | — | — |
| | | 2-methoxyethyl methacrylate | — | — | — | 5 |
| | | n-butyl acrylate | — | — | — | 5 |
| | | 2-ethylhexyl acrylate | 10 | — | — | — |
| | | 2-methoxyethyl acrylate | — | — | — | — |
| | | acrylic acid | — | — | — | — |
| | | vinyl acetate | — | — | — | 30 |
| | | vinyl propionate | — | — | — | — |
| | | vinyl benzoate | — | — | — | — |
| | | VeoVa 9 | — | — | — | 10 |
| | | VeoVa 10 | — | — | — | — |
| | | dimethyl maleate | — | — | — | 10 |
| | | di-2-methoxyethyl maleate | — | — | — | — |
| | | styrene | — | — | — | 30 |
| | | α-methylstyrene | 10 | — | 10 | — |
| | Polymerization catalyst a | azobisisobutyronitrile | — | — | — | 5 |
| | | Perbutyl I | 2 | 1 | 2 | — |
| | Solvent b | xylene | 10 | 10 | 10 | 10 |
| | Polymerization catalyst b | azobisisobutyronitrile | — | — | — | 1 |
| | | Perbutyl I | 1 | 1 | 1 | — |
| | Diluting solvent | xylene | 47 | 38 | 16 | 54 |
| | | butyl acetate | — | — | 31 | — |
| Reaction temperature (°C.) | | | 140 | 135 | 126 | 80 |
| Solid concentration (wt %) | | | 50 | 50 | 50 | 50 |
| Molecular weight of polymer (×1,000) | | | 35 | 42 | 96 | 40 |
| Symbol of polymer solution | | | $S_1$ | $S_2$ | $S_3$ | $S_4$ |

TABLE 3

| | | | Preparation Example | | | |
|---|---|---|---|---|---|---|
| | | | 1 | 2 | 3 | 4 |
| Formulation (parts) | Monomers M | monomer $M_1$ | — | — | — | — |
| | | monomer $M_2$ | — | — | — | 60 |
| | | monomer $M_3$ | — | — | — | — |
| | | monomer $M_4$ | — | — | — | — |
| | | monomer $M_5$ | 80 | — | — | — |
| | | monomer $M_6$ | — | 50 | — | — |
| | | monomer $M_7$ | — | — | 20 | — |
| | | monomer $M_8$ | — | — | — | 5 |
| | | monomer $M_9$ | — | — | — | — |
| | Other monomers | methyl methacrylate | 15 | — | 10 | 25 |
| | | n-butyl methacrylate | — | — | — | — |
| | | 2-methoxyethyl methacrylate | — | — | — | — |
| | | n-butyl acrylate | — | — | — | — |
| | | 2-ethylhexyl acrylate | 5 | — | — | — |
| | | 2-methoxyethyl acrylate | — | — | 50 | 10 |
| | | acrylic acid | — | — | — | — |
| | | vinyl acetate | — | 10 | — | — |
| | | vinyl propionate | — | 5 | — | — |
| | | vinyl benzoate | — | — | 20 | — |
| | | VeoVa 9 | — | — | — | — |
| | | VeoVa 10 | — | 5 | — | — |
| | | dimethyl maleate | — | 20 | — | — |
| | | di-2-methoxyethyl maleate | — | — | — | — |
| | | styrene | — | — | — | — |
| | | α-methylstyrene | — | 10 | — | — |
| | Polymerization catalyst | azobisisobutyronitrile | — | — | 2 | 2 |
| | | Perbutyl I | 2 | 2 | — | — |

TABLE 3-continued

|  |  | Preparation Example | | | |
|---|---|---|---|---|---|
|  |  | 1 | 2 | 3 | 4 |
| Diluting | xylene | 98 | 70 | 98 | 63 |
| solvent | butyl acetate | — | 28 | — | 35 |
| Reaction temperature (°C.) | | 120 | 120 | 80 | 80 |
| Solid concentration (wt %) | | 50 | 50 | 50 | 50 |
| Molecular weight of polymer (×1,000) | | 32 | 15 | 8 | 6 |
| Symbol of polymer solution | | $S_5$ | $S_6$ | $S_7$ | $S_8$ |

TABLE 4

|  |  |  | Preparation Example | | | |
|---|---|---|---|---|---|---|
|  |  |  | 9 | 10 | 11 | 12 |
| Formulation (parts) | Solvent | xylene | 44 | 50 | 25 | 40 |
|  |  | butyl atetate | — | — | 10 | — |
|  | Monomers M | monomer $M_1$ | — | 1 | — | — |
|  |  | monomer $M_2$ | — | — | 100 | — |
|  |  | nonomer $M_3$ | — | — | — | 20 |
|  |  | monomer $M_4$ | — | — | — | — |
|  |  | monomer $M_5$ | — | — | — | — |
|  |  | monomer $M_6$ | — | — | — | — |
|  |  | monomer $M_7$ | — | — | — | — |
|  |  | monomer $M_8$ | 50 | — | — | 30 |
|  |  | monomer $M_9$ | 5 | — | — | — |
|  | Other monomers | methyl methacrylate | — | — | — | — |
|  |  | n-butyl methacrylate | — | 30 | — | — |
|  |  | 2-methoxyethyl methacrylate | — | — | — | — |
|  |  | n-butyl acrylate | 20 | — | — | — |
|  |  | 2-ethylhexyl acrylate | — | — | — | — |
|  |  | 2-methoxyethyl acrylate | — | — | — | — |
|  |  | acrylic acid | — | — | — | — |
|  |  | vinyl acetate | — | 40 | — | — |
|  |  | vinyl propionate | — | — | — | — |
|  |  | vinyl benzoate | — | — | — | 30 |
|  |  | VeoVa 9 | 10 | — | — | — |
|  |  | VeoVa 10 | 15 | — | — | — |
|  |  | dimethyl maleate | — | — | — | — |
|  |  | di-2-methoxyethyl maleate | — | — | — | 20 |
|  |  | styrene | — | 10 | — | — |
|  |  | α-methylstyrene | — | 19 | — | — |
|  | Polymerization catalyst | azobisisobutyronitrile | — | — | — | — |
|  |  | Perbutyl I | 1 | 2 | 1 | 2 |
|  | Diluting solvent | xylene | 55 | 36 | 64 | 48 |
|  |  | butyl acetate | — | 12 | — | 10 |
| Reaction temperature (°C.) | | | 120 | 110 | 135 | 140 |
| Solid concentration (wt %) | | | 50 | 50 | 50 | 50 |
| Molecular weight of polymer (×1,000) | | | 125 | 11 | 21 | 40 |
| Symbol of polymer solution | | | $S_9$ | $S_{10}$ | $S_{11}$ | $S_{12}$ |

TABLE 5

|  |  |  | Preparation Example | | | |
|---|---|---|---|---|---|---|
|  |  |  | 13 | 14 | 15 | 16 |
| Formulation (parts) | Solvent | xylene | 44 | 30 | 35 | 40 |
|  |  | butyl atetate | — | 10 | — | — |
|  | Monomers M | monomer $M_1$ | — | — | 5 | — |
|  |  | monomer $M_2$ | 5 | — | 10 | — |
|  |  | monomer $M_3$ | — | — | — | 10 |
|  |  | monomer $M_4$ | — | 25 | 10 | — |
|  |  | monomer $M_5$ | 5 | — | — | — |
|  |  | monomer $M_6$ | — | — | — | 50 |
|  |  | monomer $M_7$ | — | 25 | — | — |

TABLE 5-continued

|  |  | Preparation Example | | | |
|---|---|---|---|---|---|
|  |  | 13 | 14 | 15 | 16 |
| Other monomers | monomer $M_8$ | — | — | — | 10 |
|  | monomer $M_9$ | — | — | — | 5 |
|  | methyl methacrylate | 50 | — | 25 | — |
|  | n-butyl methacrylate | 5 | — | — | — |
|  | 2-methoxyethyl methacrylate | 5 | — | 19 | — |
|  | n-butyl acrylate | — | 20 | 30 | — |
|  | 2-ethylhexyl acrylate | 10 | — | — | — |
|  | 2-methoxyethyl acrylate | 20 | — | — | 5 |
|  | acrylic acid | — | — | 1 | — |
|  | vinyl acetate | — | — | — | — |
|  | vinyl propionate | — | 30 | — | — |
|  | vinyl benzoate | — | — | — | — |
|  | VeoVa 9 | — | — | — | 10 |
|  | VeoVa 10 | — | — | — | — |
|  | dimethyl maleate | — | — | — | — |
|  | di-2-methoxyethyl maleate | — | — | — | — |
|  | styrene | — | — | — | 10 |
|  | α-methylstyrene | — | — | — | — |
| Polymerization catalyst | azobisisobutyronitrile | — | — | 0.5 | 2 |
|  | Perbutyl I | 5 | 5 | — | — |
| Diluting solvent | xylene | 51 | 55 | 52 | 58 |
|  | butyl acetate | — | — | 12.5 | — |
| Reaction temperature (°C.) |  | 120 | 143 | 70 | 80 |
| Solid concentration (wt %) |  | 50 | 50 | 50 | 50 |
| Molecular weight of polymer (×1,000) |  | 5 | 1 | 147 | 102 |
| Symbol of polymer solution |  | $S_{13}$ | $S_{14}$ | $S_{15}$ | $S_{16}$ |

EXAMPLES 1 TO 20

Polymer solutions $S_1$ to $S_{16}$ each was mixed with various ingredients according to the formulations shown in Tables 6 to 10 (the numerals indicating ingredient amounts are given in terms of wt %). The resulting mixtures each was homogenized with a homomixer at 2,000 rpm. Thus, twenty coating compositions were prepared.

COMPARATIVE EXAMPLES 1 TO 6

"Laroflex MP-15" (trade name of BASF AG; vinyl chloride resin), "Pliolite S-5B" (trade name of The Goodyear Tire & Rubber Company; styrene-butadiene rubber), "Toyoparax A-70" (trade name of Tosoh Corp., Japan; chlorinated paraffin resin), and "Polysol EVA-AD-3" (trade name of Showa Highpolymer Co., Ltd., Japan; ethylene/vinyl acetate copolymer) each was mixed with various ingredients according to the formulations shown in Table 11 (the numerals indicating ingredient amounts are given in terms of wt %). The resulting mixtures each was homogenized with a homomixer at 2,000 rpm. Thus, three coating compositions were prepared.

In Tables 6 to 11, "Dimerex" (trade name of Hercules Inc.) is a polymerized rosin, "Disparlon A630-20X" and "Disparlon 4300" (trade names of Kusumoto Chemicals Ltd., Japan) and "Bentone SD-2" (trade name of Rheox, Inc.) each is an antisagging agent, "KMP590" (trade name of Shin-Etsu Chemical Co., Ltd., Japan) is a silicone resin powder, and "Tinuvin 900" (trade name of Ciba-Geigy Ltd.) is an ultraviolet absorber.

TABLE 6

|  |  | Example | | | |
|---|---|---|---|---|---|
|  |  | 1 | 2 | 3 | 4 |
| Ingredient A | tall rosin | 10 | — | — | — |
|  | gum rosin | — | — | 10 | 30 |
|  | wood rosin | — | 5 | — | — |
|  | Dimerex | — | — | — | — |
|  | hydrogenated rosin | — | — | — | — |
| Ingredient B | polymer solution $S_1$ | 20 | 10 | — | — |
|  | polymer solution $S_2$ | — | — | 45 | 20 |
|  | polymer solution $S_3$ | — | 20 | — | — |
|  | polymer solution $S_4$ | — | — | — | — |
|  | polymer solution $S_5$ | — | — | — | 20 |
|  | polymer solution $S_6$ | — | — | — | — |
|  | polymer solution $S_7$ | — | — | — | — |
|  | polymer solution $S_8$ | — | — | — | — |
|  | polymer solution $S_9$ | — | — | — | — |
| Ingredient C | cuprous oxide | 5 | — | 36 | 5 |
|  | copper thiocyanate | — | 20 | — | — |
|  | Cu—Ni solid solution alloy | — | — | — | 5 |
|  | N,N-dimethylchlorophenylurea | — | 10 | — | — |
|  | 4,5-dichloro-2-n-octylisothiszolin-3-one | 10 | — | — | — |

TABLE 6-continued

|  |  | Example | | | |
|---|---|---|---|---|---|
|  |  | 1 | 2 | 3 | 4 |
|  | 2,3,5,6-tetrachloro-4-(methylsulfonyl)pyridine | — | 10 | — | — |
|  | 2-pyridinethiol-1-oxide zinc salt | — | — | 2 | — |
|  | 2,4,6-trichlorophenylmaleimide | 3 | — | — | — |
|  | 3-iodo-2-propynylbutyl carbamate | 5 | — | — | — |
| Plasticizer | chlorinated paraffin | — | — | — | — |
|  | tricresyl phosphate | — | — | — | — |
| Pigment | talc | — | — | — | 2 |
|  | red iron oxide | 3 | 5 | 2 | 1 |
|  | zinc oxide | — | 3 | — | 1 |
|  | titanium dioxide | — | 1 | 1 | 1 |
| Antisagging | Disparlon A630-20X | 2 | 2 | 2 | 3 |
| agent | Bentone SD-2 | 1 | — | — | — |
| Additive | trimethyl silanol | — | — | — | — |
|  | KMP590 | — | — | — | — |
|  | Tinuvin 900 | — | — | — | — |
| Solvent | xylene | 31 | 14 | 2 | 12 |
|  | butyl acetate | 10 | — | — | — |
| Total |  | 100 | 100 | 100 | 100 |

TABLE 7

|  |  | Example | | | |
|---|---|---|---|---|---|
|  |  | 5 | 6 | 7 | 8 |
| Ingredient A | tall rosin | — | — | — | — |
|  | gum rosin | — | 5 | — | 12 |
|  | wood rosin | — | 10 | — | — |
|  | Dimerex | 20 | — | — | — |
|  | hydrogenated rosin | — | — | 55 | — |
| Ingredient B | polymer solution $S_1$ | — | — | — | — |
|  | polymer solution $S_2$ | — | — | — | — |
|  | polymer solution $S_3$ | — | — | — | — |
|  | polymer solution $S_4$ | 40 | — | — | — |
|  | polymer solution $S_5$ | — | 30 | 5 | — |
|  | polymer solution $S_6$ | — | — | — | 25 |
|  | polymer solution $S_7$ | — | — | — | — |
|  | polymer solution $S_8$ | — | — | 10 | — |
|  | polymer solution $S_9$ | — | — | — | — |
| Ingredient C | cuprous oxide | — | 30 | — | 20 |
|  | copper thiocyanate | 10 | 10 | — | — |
|  | Cu—Ni solid solution alloy | — | — | — | — |
|  | 2,4,5,6-tetrachloroisophthalonitrile | 10 | — | — | — |
|  | N-(fluorodichloromethylthio)phthalimide | — | — | — | 20 |
|  | 2,3,5,6-tetrachloro-4-(methylsulfonyl)pyridine | 10 | — | — | — |
|  | 2-pyridinethiol-1-oxide zinc salt | — | — | 2 | — |
|  | 2-pyridinethiol-1-oxide copper salt | — | 2 | — | — |
|  | 3-iodo-2-propynylbutyl carbamate | — | — | 2 | — |
| Plasticizer | chlorinated paraffin | 3 | — | — | — |
|  | tricresyl phosphate | — | — | — | — |
| Pigment | talc | — | — | 8 | 2 |
|  | red iron oxide | — | — | 2 | 2 |
|  | zinc oxide | — | — | 5 | — |
|  | titanium dioxide | 1 | — | 3 | 1 |
| Antisagging | Disparlon A630-20X | 4 | 3 | 3 | 2 |
| agent | Bentone SD-2 | — | — | — | 1 |
| Additive | trimethyl silanol | — | — | — | — |
|  | KMP590 | — | — | — | — |
|  | Tinuvin 900 | — | — | — | — |
| Solvent | xylene | 2 | 10 | 5 | 15 |
|  | butyl acetate | — | — | — | — |
| Total |  | 100 | 100 | 100 | 100 |

TABLE 8

| | | Example | | | |
|---|---|---|---|---|---|
| | | 9 | 10 | 11 | 12 |
| Ingredient A | tall rosin | 1 | — | — | 20 |
| | gum rosin | — | — | 20 | 15 |
| | wood rosin | — | — | — | 15 |
| | Dimerex | — | 20 | — | 20 |
| | hydrogenated rosin | — | — | — | — |
| Ingredient B | polymer solution $S_1$ | — | 30 | — | — |
| | polymer solution $S_2$ | — | — | — | — |
| | polymer solution $S_3$ | — | — | — | — |
| | polymer solution $S_7$ | 30 | — | — | — |
| | polymer solution $S_8$ | — | — | — | — |
| | polymer solution $S_9$ | — | 5 | — | — |
| | polymer solution $S_{10}$ | — | — | 25 | — |
| | polymer solution $S_{11}$ | — | — | 5 | — |
| | polymer solution $S_{12}$ | — | — | — | 2 |
| Ingredient C | cuprous oxide | — | — | 10 | 20 |
| | copper thiocyanate | — | — | 10 | — |
| | Cu—Ni solid solution alloy | 50 | — | — | — |
| | 2,4,5,6-tetrachloroisophthalonitrile | — | — | — | — |
| | N,N-dimethylchlorophenylurea | — | — | — | — |
| | 4,5-dithloro-2-n-octylisothiazolin-3-one | — | — | — | — |
| | 2-pyridinethiol-1-oxide zinc salt | — | — | 15 | — |
| | 2-pyridinethiol-1-oxide copper salt | — | — | 5 | — |
| | 2-(thiocyanomethylthio)benzothiszole | — | 30 | — | — |
| Plasticizer | chlorinated paraffin | 1 | — | — | — |
| | tricresyl phosphate | 1 | — | — | — |
| Pigment | talc | — | — | 1 | — |
| | red iron oxide | — | — | — | 2 |
| | zinc oxide | — | 3 | 1 | — |
| | titanium dioxide | — | 1 | — | — |
| Antisagging agent | Disparlon A630-20X | 3 | 3 | 3 | 3 |
| | Bentone SD-2 | — | — | — | — |
| Additive | trimethyl silanol | — | — | — | — |
| | KMP590 | — | — | — | — |
| | Tinuvin 900 | — | — | — | — |
| Solvent | xylene | 9 | 8 | 5 | 3 |
| | butyl acetate | 5 | — | — | — |
| Total | | 100 | 100 | 100 | 100 |

TABLE 9

| | | Example | | | |
|---|---|---|---|---|---|
| | | 13 | 14 | 15 | 16 |
| Ingredient A | tall rosin | 1 | — | — | 20 |
| | gum rosin | 13 | — | — | — |
| | wood rosin | — | — | 5 | — |
| | Dimerex | — | 5 | — | — |
| | hydrogenated rosin | — | 5 | — | — |
| Ingredient B | polymer solution $S_1$ | — | — | — | 5 |
| | polymer solution $S_2$ | 4 | — | — | — |
| | polymer solution $S_3$ | — | 3 | — | — |
| | polymer solution $S_{11}$ | — | — | 20 | — |
| | polymer solution $S_{12}$ | — | — | — | 5 |
| | polymer solution $S_{13}$ | 4 | — | 15 | — |
| | polymer solution $S_{14}$ | — | 60 | — | — |
| | polymer solution $S_{15}$ | — | — | 20 | — |
| | polymer solution $S_{16}$ | — | — | — | 20 |
| Ingredient C | cuprous oxide | 68 | — | 20 | — |
| | copper thiocyanate | — | — | — | 20 |
| | Cu—Ni solid solution alloy | | | | |
| | 2,4,5,6-tetrachloroisophthalonitrile | — | — | — | — |
| | N,N-dimethylchlorophenylurea | — | — | — | — |
| | pyridine triphenylborane | — | 3 | — | — |
| | 2,3,5,6-tetrachloro-4-(methylsulfonyl)pyridine | 2 | — | — | — |
| | 2-pyridinethiol-1-oxide copper salt | — | — | 1 | — |
| | zinc dimethylthiocarbamate | — | 2 | — | — |
| Plasticizer | chlorinated paraffin | — | — | — | 5 |
| | tricresyl phosphate | — | — | 2 | — |
| Pigment | talc | — | — | — | 2 |
| | red iron oxide | | | | |

TABLE 9-continued

|  |  | Example | | | |
|---|---|---|---|---|---|
|  |  | 13 | 14 | 15 | 16 |
|  | zinc oxide | — | 1 | 1 | 5 |
|  | titanium dioxide |  |  |  |  |
| Antisagging | Disparlon A630-20X | 2 | 3 | 3 | 3 |
| agent | Bentone SD-2 | 1 | — | — | — |
| Additive | trimethyl silanol | — | — | 1 | — |
|  | KMP590 | — | — | 1 | — |
|  | Tinuvin 900 | — | — | 1 | — |
| Solvent | xylene | 6 | 18 | 10 | 15 |
|  | butyl acetate | — | — | — | — |
| Total |  | 100 | 100 | 100 | 100 |

TABLE 10

|  |  | Example | | | |
|---|---|---|---|---|---|
|  |  | 17 | 18 | 19 | 20 |
| Ingredient A | tall rosin | — | — | — | 0.5 |
|  | wood rosin | — | — | 2 | — |
|  | copper rosinate | 3 | — | — | — |
|  | calcium rosinate | — | 30 | — | — |
|  | zinc rosinate | — | 30 | — | — |
| Ingredient B | polymer solution $S_2$ | 60 | — | — | — |
|  | polymer solution $S_4$ | — | — | — | 40 |
|  | polymer solution $S_5$ | — | — | — | 40 |
|  | polymer solution $S_6$ | — | — | — | — |
|  | polymer solution $S_7$ | — | — | — | — |
|  | polymer solution $S_8$ | — | 27.4 | — | — |
|  | polymer solution $S_9$ | — | — | — | — |
|  | polymer solution $S_{10}$ | — | — | — | — |
|  | polymer solution $S_{11}$ | — | 70 | — | — |
| Ingredient C | cuprous oxide | 5 | — | 15 | 5 |
|  | copper thiocyanate | 3 | — | — | — |
|  | Cu—Ni solid solution alloy | — | — | 2 | — |
|  | 2,4,5,6-tetrachloroisophthalonitrile | — | 0.2 | — | 1 |
|  | N,N-dimethylchlorophenylurea | — | — | — | — |
|  | 4,5-dichloro-2-n-octylisothiazolin-3-one | — | — | — | 5 |
|  | N-(fluorodichloromethylthio)phthalimide | — | — | — | — |
|  | pyridine triphenylborane | 5 | — | — | — |
|  | 2-pyridinethiol-1-oxide copper salt | 5 | — | 2 | 1 |
| Plasticizer | chlorinated paraffin | — | — | — | — |
|  | tricresyl phosphate | — | — | — | — |
| Pigment | talc | 2 | — | — | — |
|  | red iron oxide | 3 | 1 | 1 | 2 |
|  | zinc oxide | 1 | — | — | — |
|  | titanium dioxide | 3 | — | 1 | — |
| Antisagging | Disparlon A630-20X | 2 | 1 | 2 | 3 |
| agent | Bentone SD-2 | 1 | — | — | — |
| Additive | trimethyl silanol | — | — | — | — |
|  | KNP590 | — | — | — | — |
|  | Tinuvin 900 | — | — | — | — |
| Solvent | xylene | 7 | 0.4 | 5 | 2.5 |
|  | butyl acetate | — | 10 | — | — |
| Total |  | 100 | 100 | 100 | 100 |

TABLE 11

|  |  | Comparative Example | | | | | |
|---|---|---|---|---|---|---|---|
|  |  | 1 | 2 | 3 | 4 | 5 | 6 |
| Ingredient A | tall rosin | — | — | — | — | — | — |
|  | gum rosin | 20 | 20 | 20 | — | 5 | 20 |
|  | wood rosin | — | — | — | — | — | — |
|  | Dimerex | — | — | — | — | — | — |
|  | hydrogenated rosin | — | — | — | — | — | — |
| Blending | Laroflex MP-15 | 10 | — | — | — | — | — |
| polymer | Pliolite S-5B | — | 10 | — | — | — | — |

TABLE 11-continued

|  |  | Comparative Example | | | | | |
|---|---|---|---|---|---|---|---|
|  |  | 1 | 2 | 3 | 4 | 5 | 6 |
|  | Toyoparax A-70 | — | — | 10 | — | — | — |
|  | polymer solution S$_7$ | — | — | — | 70 | — | — |
|  | polyisobutylene | — | — | — | — | 5 | — |
|  | Polysol EVA-AD-3 (50% solution) | — | — | — | — | — | 10 |
| Ingredient C | cuprous oxide | 30 | 30 | 30 | 20 | 37 | 37 |
|  | copper thiocyanate | — | — | — | — | — | — |
|  | Cu—Ni solid solution alloy | — | — | — | — | — | — |
|  | 2,4,5,6-tetrachloroisophthalonitrile | — | — | — | — | — | — |
|  | N,N-dimethylchlorophenylurea | — | — | — | — | — | — |
|  | 4,5-dichloro-2-n-octylisothiazolin-3-one | — | — | — | — | — | — |
|  | N-(fluorodichloromethylthio)phthalimide | — | — | — | — | — | — |
|  | pyridine triphenylborane | — | — | — | — | — | — |
|  | 2,3,5,6-tetrachloro-4-(methylsulfonyl)pyridine | — | — | — | — | — | — |
|  | 2-pyridinethiol-1-oxide zinc salt | — | — | — | — | — | — |
|  | 2-pyridinethiol-1-oxide copper salt | — | — | — | — | — | — |
|  | 2,4,6-trichlorophenylmaleimide | — | — | — | — | — | — |
|  | 3-iodo-2-propynylbutyl carbamate | — | — | — | 5 | — | — |
|  | zinc dimethyldithiocarbamate | — | — | — | — | — | — |
|  | 2-(thiocyanomethylthio)benzothiazole | — | — | — | — | — | — |
| Plasticizer | chlorinated paraffin | — | — | — | — | — | — |
|  | tricresyl phosphate | — | — | — | — | — | — |
| Pigment | talc | 2 | 2 | 2 | — | — | — |
|  | red iron oxide | 2 | 2 | 2 | — | — | 3 |
|  | zinc oxide | — | — | — | — | — | — |
|  | titanium dioxide | 1 | 1 | 1 | — | — | — |
| Antisagging agent | Disparlon A630-20X | 2 | 2 | 2 | 3 | — | — |
|  | Disparlon 4300 | — | — | — | — | — | 10 |
|  | Bentone SD-2 | 1 | 1 | 1 | — | — | — |
| Additive | trimethyl silanol | — | — | — | — | — | — |
|  | KMP590 | — | — | — | — | — | — |
|  | Tinuvin 900 | — | — | — | — | — | — |
| Solvent | xylene | 32 | 32 | 32 | 2 | 45 | 20 |
|  | solvent naphtha | — | — | — | — | 5 | — |
|  | MIBK | — | — | — | — | 3 | — |
|  | butyl acetate | — | — | — | — | — | — |
| Total |  | 100 | 100 | 100 | 100 | 100 | 100 |

Each of the coating compositions prepared in Examples 1 to 20 and Comparative Examples 1 to 6 given above was subjected to a test for examining film surface residue layer formation, film erosion test, antifouling performance test, adhesion test, cracking resistance test, recoating test, and test for evaluating the ability to prevent marine-organism attachment over the out-fitting period, by the methods described below. The results obtained are shown in Tables 12 to 20 given later.

Test for Examining Film Surface Residue Layer Formation

Blasted steel panels (100 mm×200 mm×1 mm) were spray-coated twice with a tar-epoxy anticorrosive paint in a thickness of 125 µm on a dry basis for each application, and further coated with a tar-vinyl sealer coat in a thickness of 70 µm on a dry basis. The steel panels were then spray-coated twice with each coating composition in a thickness of 100 µm for each application. The thus-coated steel panels were dried for 1 week in a thermo-hygrostatic chamber at 20° C. and a humidity of 75%. Thus, six test pieces were produced for each coating composition.

The test pieces thus produced were immersed in artificial seawater. After immersion for each of 3, 6, 12, 18, and 24 months, the test pieces were pulled out of the water and cut. The cut surfaces were polished and then examined with a stereomicroscope to measure the thickness of any residue layer formed on each coating film surface.

Film Erosion Test

Steel panels (100 mm×100 mm×1 mm) which each had been coated on both sides with an anticorrosive paint were spray-coated, on the front side, with each coating composition twice in a thickness of 200 µm on a dry basis for each application. The thus-coated steel panels were dried indoors at 20° C. for 1 week to produce test pieces.

These test pieces were fixed to the outer circumferential surface of a cylindrical drum having a diameter of 50 cm. This drum was immersed in the seawater of Yura Bay, Sumoto, Hyogo, Japan at a depth of 1 m from the sea level, and rotated with a motor at such a rate that the peripheral speed of the drum was 16 knots. The reduction in coating film thickness caused by erosion was measured at an interval of 3 months over a period of 24 months. The average film erosion rate (µm/month) for the initial 6 months and that for the period of from the 6th to the 24th month were calculated. An average film erosion rate of 3 µm/month or higher correlates with satisfactory antifouling performance. In test pieces in which the average film erosion rate for the 6th to 24th month period was within the range of ±1 µm/month based on the average film erosion rate for the initial 6 months, the rate of film erosion was constant.

Antifouling Performance Test

Sandblasted steel panels (100 mm×200 mm×1 mm) coated beforehand with a tar-vinyl anticorrosive paint were spray-coated on both sides with each coating composition twice in a thickness of 240 μm on a dry basis for each side. The coated panels were dried for 1 week in a thermo-hygrostatic chamber at 20° C. and a humidity of 75% to produce test pieces. These test pieces were immersed in the seawater of Aioi Bay, Aioi, Hyogo, Japan, for 24 months to examine the change with time of the proportion of that area of the coating film which was covered with marine organisms attached thereto.

Adhesion Test

Blasted steel panels were spray-coated twice with a tar-epoxy anticorrosive paint in a thickness of 125 μm on a dry basis for each application, and further coated with a tar-vinyl sealer coat in a thickness of 70 μm on a dry basis. The coated steel panels were spray-coated twice with each coating composition in a thickness of 100 μm on a dry basis for each application and then dried for 1 week in a thermo-hygrostatic chamber at 20° C. and a humidity of 75% to produce test pieces.

These test pieces were immersed in artificial seawater. After immersion for each of 3, 6, 12, 18, and 24 months, the test pieces were pulled out of the water and subjected to a crosscut tape test in which the coating film was incised at an interval of 2 mm. Adhesion was evaluated as follows: the test pieces in which the number of peeled squares was 0 per 25 are indicated by ○ (acceptable), and those in which that number was 1 or larger per 25 are indicated by x (unacceptable).

Cracking Resistance Test

When the test pieces were pulled out of the artificial seawater in the adhesion test, each coating film was visually examined for cracks. The test pieces having no cracks are indicated by ○ (acceptable), while those having cracks are indicated by x (unacceptable).

Recoating Test

Steel panels (100 mm×100 mm×1 mm) which each had been coated on both sides with an anticorrosive paint were spray-coated, on the front side, with each coating composition twice in a thickness of 100 μm on a dry basis for each application. The thus-coated steel panels were dried indoors at 20° C. for 1 week. Thus, two test pieces were produced for each coating composition.

These test pieces were immersed in artificial seawater. After immersion for each of 12 and 24 months, the test pieces were pulled out of the water, washed with distilled water, and then dried indoors at 20° C. for 1 week. Thereafter, each test piece was spray-coated twice with the same coating composition as that with which the test piece had been coated, in a thickness of 100 μm on a dry basis for each application. The recoated test pieces were dried indoors at 20° C. for 1 week. These test pieces were fixed to the outer circumferential surface of a cylindrical drum having a diameter of 50 cm. This drum was immersed in the seawater of Yura Bay, Sumoto, Hyogo, Japan, at a depth of 1 m from the sea level, and rotated with a motor at such a rate that the peripheral speed of the drum was 16 knots. After immersion for 1 week, the test pieces were pulled out of the seawater and examined for the peeling of the fresh coating film from the old one. The test pieces which suffered no peeling are indicated by ○ (acceptable), while those which suffered peeling are indicated by x (unacceptable).

Test for Evaluating the Ability to Prevent Marine-organism Attachment over Out-fitting Period Sandblasted steel panels (100 mm×300 mm×1 mm) coated beforehand with a tar-vinyl anticorrosive paint were spray-coated on both sides with each coating composition twice in a thickness of 240 μm on a dry basis for each side. The coated panels were dried for 1 week in a thermo-hygrostatic chamber at 20° C. and a humidity of 75% to produce test pieces. These test pieces were immersed in the seawater of Owase Bay, Mie, Japan, over a period of 3 months from July to September, 1996 while being kept parallel to the water surface at a depth of 1 m from the sea level to examine the change with time of the proportion of that area of the coating film which was covered with marine organisms attached thereto.

Further, for the purpose of a comparison between Owase Bay and Aioi Bay in the degree of fouling by organisms during that period, and for the purpose of a comparison between vertical immersion and horizontal immersion, test pieces coated with the tar-vinyl anticorrosive paint only were immersed in both sea areas to compare the test pieces based on the weight of the organisms which adhered thereto.

TABLE 12

Test for examining film surface residue layer formation
Thickness of residue layer on film surface (μm)

| | 3 months | 6 months | 12 months | 18 months | 24 months |
|---|---|---|---|---|---|
| Example 1 | 0 | a | 0 | 0 | 0 |
| Example 2 | 0 | 0 | 0 | 0 | 0 |
| Example 3 | 0 | 0 | 0 | 0 | 0 |
| Example 4 | 0 | 0 | 0 | 0 | 0 |
| Example 5 | 0 | 0 | 0 | 0 | 0 |
| Example 6 | 0 | 0 | 0 | 0 | 0 |
| Example 7 | 0 | 0 | 0 | 0 | 0 |
| Example 8 | 0 | 0 | 0 | 0 | 0 |
| Example 9 | 0 | 0 | 0 | 0 | 0 |
| Example 10 | 0 | 0 | 0 | 0 | 0 |
| Example 11 | 0 | 0 | 0 | 0 | 0 |
| Example 12 | 0 | 0 | 0 | 0 | 0 |
| Example 13 | 0 | 0 | 0 | 0 | 0 |
| Example 14 | 0 | 0 | 0 | 0 | 0 |
| Example 15 | 0 | 0 | 0 | 0 | 0 |
| Example 16 | 0 | 0 | 0 | 0 | 0 |
| Example 17 | 0 | 0 | 0 | 0 | 0 |
| Example 18 | 0 | 0 | 0 | 0 | 0 |
| Example 19 | 0 | 0 | 0 | 0 | 0 |
| Example 20 | 0 | 0 | 0 | 0 | 0 |
| Comparative Example 1 | 5 | 5 | 10 | 10 | 10 |
| Comparative Example 2 | 20 | 50 | 10 | 100 | 100 |
| Comparative Example 3 | 5 | 10 | 30 | 70 | 100 |
| Comparative Example 4 | 0 | 0 | 5 | 5 | 10 |
| Comparative Example 5 | 15 | 50 | 90 | 120 | 140 |
| Comparative Example 6 | 10 | 30 | 70 | 90 | 100 |

TABLE 13

| | | Film erosion test | | | | | | | |
|---|---|---|---|---|---|---|---|---|---|
| | | Film thickness reduction (μm) | | | | | | | |
| | | 3 months | 6 months | 9 months | 12 months | 15 months | 18 months | 21 months | 24 months |
| Example | 1 | 15 | 31 | 44 | 61 | 77 | 88 | 103 | 125 |
| | 2 | 28 | 60 | 88 | 115 | 151 | 181 | 212 | 243 |
| | 3 | 12 | 25 | 36 | 49 | 58 | 74 | 86 | 99 |
| | 4 | 8 | 18 | 29 | 38 | 48 | 57 | 65 | 76 |
| | 5 | 36 | 72 | 108 | 144 | 180 | 216 | 252 | 288 |
| | 6 | 20 | 41 | 66 | 82 | 102 | 128 | 149 | 171 |
| | 7 | 26 | 50 | 70 | 95 | 119 | 148 | 172 | 195 |
| | 8 | 30 | 65 | 102 | 130 | 168 | 201 | 233 | 267 |
| | 9 | 18 | 37 | 56 | 74 | 95 | 112 | 129 | 144 |
| | 10 | 39 | 76 | 117 | 150 | 191 | 230 | 269 | 309 |
| | 11 | 13 | 29 | 46 | 62 | 71 | 91 | 105 | 121 |
| | 12 | 26 | 55 | 81 | 106 | 136 | 165 | 191 | 219 |
| | 13 | 27 | 53 | 83 | 102 | 133 | 161 | 189 | 216 |
| | 14 | 44 | 89 | 133 | 179 | 222 | 273 | 316 | 362 |
| | 15 | 23 | 48 | 71 | 99 | 118 | 142 | 169 | 195 |
| | 16 | 46 | 95 | 142 | 193 | 240 | 289 | 338 | 386 |
| | 17 | 31 | 59 | 90 | 118 | 152 | 179 | 212 | 235 |
| | 18 | 11 | 23 | 38 | 50 | 58 | 70 | 85 | 101 |
| | 19 | 35 | 70 | 103 | 142 | 182 | 214 | 250 | 285 |
| | 20 | 24 | 47 | 72 | 98 | 121 | 140 | 170 | 189 |
| Comparative Example | 1 | 8 | 15 | 17 | 18 | 20 | 22 | 23 | 23 |
| | 2 | 0 | 0 | 1 | 2 | 2 | 2 | 2 | 2 |
| | 3 | 20 | 59 | 77 | 82 | 85 | 87 | 90 | 91 |
| | 4 | 7 | 19 | 27 | 37 | 44 | 52 | 52 | 52 |
| | 5 | 0 | 1 | 2 | 4 | 5 | 5 | 5 | 5 |
| | 6 | 29 | 59 | 78 | 92 | 95 | 100 | 102 | 103 |

TABLE 14

| | Film erosion test | |
|---|---|---|
| | Average film erosion rate (μm/month) | |
| | initial 6 months | from 6th to 24th month |
| Example 1 | 5.3 | 5.1 |
| Example 2 | 10.7 | 10.3 |
| Example 3 | 4.3 | 4.1 |
| Example 4 | 3.3 | 3.2 |
| Example 5 | 12.0 | 12.0 |
| Example 6 | 7.0 | 7.2 |
| Example 7 | 8.0 | 8.2 |
| Example 8 | 11.7 | 11.2 |
| Example 9 | 6.3 | 6.0 |
| Example 10 | 12.3 | 12.9 |
| Example 11 | 5.3 | 5.0 |
| Example 12 | 9.7 | 9.2 |
| Example 13 | 8.7 | 9.0 |
| Example 14 | 15.0 | 15.2 |
| Example 15 | 8.3 | 8.1 |
| Example 16 | 16.3 | 16.2 |
| Example 17 | 9.3 | 9.9 |
| Example 18 | 4.0 | 4.1 |
| Example 19 | 11.7 | 12.0 |
| Example 20 | 7.7 | 7.9 |
| Comparative Example 1 | 2.3 | 0.5 |
| Comparative Example 2 | 0.0 | 0.1 |
| Comparative Example 3 | 13.0 | 1.5 |
| Comparative Example 4 | 4.0 | 2.0 |
| Comparative Example 5 | 0.3 | 0.2 |
| Comparative Example 6 | 10.0 | 2.2 |

TABLE 15

| | Antifouling performance test | | | | |
|---|---|---|---|---|---|
| | Proportion of area covered with marine organisms (%) | | | | |
| | 3 months | 6 months | 12 months | 18 months | 24 months |
| Example 1 | 0 | 0 | 0 | c | 0 |
| Example 2 | 0 | 0 | 0 | 0 | 0 |
| Example 3 | 0 | 0 | 0 | 0 | 0 |
| Example 4 | 0 | 0 | 0 | 0 | 0 |
| Example 5 | 0 | 0 | 0 | 0 | 0 |
| Example 6 | 0 | 0 | 0 | 0 | 0 |
| Example 7 | 0 | 0 | 0 | 0 | 0 |
| Example 8 | 0 | 0 | 0 | 0 | 0 |
| Example 9 | 0 | 0 | 0 | 0 | 0 |
| Example 10 | 0 | 0 | 0 | 0 | 0 |
| Example 11 | 0 | 0 | 0 | 0 | c |
| Example 12 | 0 | 0 | 0 | 0 | 0 |
| Example 13 | 0 | 0 | 0 | 0 | 0 |
| Example 14 | 0 | 0 | 0 | 0 | 0 |
| Example 15 | 0 | 0 | 0 | 0 | 0 |
| Example 16 | 0 | 0 | 0 | 0 | 0 |
| Example 17 | 0 | 0 | 0 | 0 | 0 |
| Example 18 | 0 | 0 | 0 | 0 | 0 |
| Example 19 | 0 | 0 | 0 | 0 | 0 |
| Example 20 | 0 | 0 | 0 | 0 | 0 |
| Comparative Example 1 | 10 | 20 | 100 | 100 | 100 |
| Comparative Example 2 | 5 | 30 | 60 | 100 | 100 |
| Comparative Example 3 | 0 | 20 | 50 | 90 | 100 |
| Comparative Example 4 | 0 | 0 | 0 | 0 | 30 |
| Comparative Example 5 | 10 | 30 | 100 | 100 | 100 |
| Comparative Example 6 | 0 | 0 | 30 | 100 | 100 |

TABLE 16

Adhesion test

| | 3 months | 6 months | 12 months | 18 months | 24 months |
|---|---|---|---|---|---|
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Example 5 | ○ | ○ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Example 17 | ○ | ○ | ○ | ○ | ○ |
| Example 18 | ○ | ○ | ○ | ○ | ○ |
| Example 19 | ○ | ○ | ○ | ○ | ○ |
| Example 20 | ○ | ○ | ○ | ○ | ○ |
| Comparative Example 1 | x | x | x | x | x |
| Comparative Example 2 | x | x | x | x | x |
| Comparative Example 3 | x | x | x | x | x |
| Comparative Example 4 | ○ | ○ | ○ | ○ | x |
| Comparative Example 5 | x | x | x | x | x |
| Comparative Example 6 | x | x | x | x | x |

TABLE 17

Cracking resistance test

| | 3 months | 6 months | 12 months | 18 months | 24 months |
|---|---|---|---|---|---|
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Example 5 | ○ | ○ | ○ | ○ | ○ |
| Example 6 | ○ | ○ | ○ | ○ | ○ |
| Example 7 | ○ | ○ | ○ | ○ | ○ |
| Example 8 | ○ | ○ | ○ | ○ | ○ |
| Example 9 | ○ | ○ | ○ | ○ | ○ |
| Example 10 | ○ | ○ | ○ | ○ | ○ |
| Example 11 | ○ | ○ | ○ | ○ | ○ |
| Example 12 | ○ | ○ | ○ | ○ | ○ |
| Example 13 | ○ | ○ | ○ | ○ | ○ |
| Example 14 | ○ | ○ | ○ | ○ | ○ |
| Example 15 | ○ | ○ | ○ | ○ | ○ |
| Example 16 | ○ | ○ | ○ | ○ | ○ |
| Example 17 | ○ | ○ | ○ | ○ | ○ |
| Example 18 | ○ | ○ | ○ | ○ | ○ |
| Example 19 | ○ | ○ | ○ | ○ | ○ |
| Example 20 | ○ | ○ | ○ | ○ | ○ |
| Comparative Example 1 | x | x | x | x | x |
| Comparative Example 2 | x | x | x | x | x |
| Comparative Example 3 | x | x | x | x | x |
| Comparative Example 4 | ○ | ○ | ○ | ○ | x |
| Comparative Example 5 | x | x | x | x | x |
| Comparative Example 6 | x | x | x | x | x |

TABLE 18

Recoating test

| | old-film immersion period, 12 months | old-film immersion period, 24 months |
|---|---|---|
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Example 7 | ○ | ○ |
| Example 8 | ○ | ○ |
| Example 9 | ○ | ○ |
| Example 10 | ○ | ○ |
| Example 11 | ○ | ○ |
| Example 12 | ○ | ○ |
| Example 13 | ○ | ○ |
| Example 14 | ○ | ○ |
| Example 15 | ○ | ○ |
| Example 16 | ○ | ○ |
| Example 17 | ○ | ○ |
| Example 18 | ○ | ○ |
| Example 19 | ○ | ○ |
| Example 20 | ○ | ○ |
| Comparative Example 1 | x | x |
| Comparative Example 2 | x | x |
| Comparative Example 3 | x | x |
| Comparative Example 4 | x | x |
| Comparative Example 5 | x | x |
| Comparative Example 6 | x | x |

TABLE 19

Test for evaluating the ability to prevent marine-organism attachment over out-fitting period
Proportion of area covered with marine organisms (%)

| | 1 month | 2 months | 3 months |
|---|---|---|---|
| Example 1 | 0 | 0 | 0 |
| Example 2 | 0 | 0 | 0 |
| Example 3 | 0 | 0 | 0 |
| Example 4 | 0 | 0 | 0 |
| Example 5 | 0 | 0 | 0 |
| Example 6 | 0 | 0 | 0 |
| Example 7 | 0 | 0 | 0 |
| Example 8 | 0 | 0 | 0 |
| Example 9 | 0 | 0 | 0 |
| Example 10 | 0 | 0 | 0 |
| Example 11 | 0 | 0 | 0 |
| Example 12 | 0 | 0 | 0 |
| Example 13 | 0 | 0 | 0 |
| Example 14 | 0 | 0 | 0 |
| Example 15 | 0 | 0 | 0 |
| Example 16 | 0 | 0 | 0 |
| Example 17 | 0 | 0 | 0 |
| Example 18 | 0 | 0 | 0 |
| Example 19 | 0 | 0 | 0 |
| Example 20 | 0 | 0 | 0 |
| Comparative Example 1 | 50 | 100 | 100 |
| Comparative Example 2 | 40 | 60 | 100 |
| Comparative Example 3 | 100 | 100 | 100 |
| Comparative Example 4 | 10 | 40 | 100 |
| Comparative | 80 | 100 | 100 |

TABLE 19-continued

Test for evaluating the ability to prevent
marine-organism attachment over out-fitting period
Proportion of area covered with marine organisms (%)

|  | 1 month | 2 months | 3 months |
|---|---|---|---|
| Example 5 Comparative Example 6 | 30 | 80 | 100 |

TABLE 20

Comparison in the degree of fouling by organisms with test
pieces uncoated with antifouling paint for preventing
marine-organism attachment Weight of adherent marine organisms (kg)

|  | 1 month | 2 months | 3 months |
|---|---|---|---|
| Owase (horizontal immersion) | 1.5 | 2.2 | 3.2 |
| Owase (vertical immersion) | 0.4 | 1.0 | 1.8 |
| Aioi (horizontal immersion) | 0.3 | 0.7 | 1.2 |
| Aioi (vertical immersion) | 0.2 | 0.5 | 1.0 |

The proportion of the area covered with marine organisms was 100% in each case.
*Owase: Owase Bay, Mie, Japan
Aioi: Aioi Bay, Hyogo, Japan As apparent from the results given in Tables 12 to 20, all the comparative compositions containing prior art rosin-blending polymers, namely the composition of Comparative Example 1 which contained "Laroflex MP-15" (trade name of BASF AG; vinyl chloride resin), the composition of Comparative Example 2 (corresponding to an Example of JP-A-60-28456) which contained "Pliolite S-5B" (trade name of The Goodyear Tire & Rubber Company; styrene-butadiene rubber), the composition of Comparative Example 3 (corresponding to another Example of JP-A-60-28456) which contained "Toyoparax A-70" (trade name of Tosoh Corp.; chlorinated paraffin resin), the composition of Comparative Example 5 (corresponding to an Example of JP-A-50-135125) which contained polyisobutylene, and the composition of Comparative Example 6 (corresponding to still another Example of JP-A-60-28456) which contained "Polysol EVA-AD-3" (trade name of Showa Highpolymer Co., Ltd.; ethylene/vinyl acetate copolymer, 50% solution), and the coating composition of Comparative Example 4 (corresponding to an Example of U.S. Pat. No. 5,436,284) not containing ingredient A of the present invention gave coating films on which a residue layer was formed in long-term immersion and which were unsatisfactory in both film erosion rate and antifouling performance, although the coating films obtained from some of these comparative compositions showed satisfactory erodibility for several months from the initiation of immersion. The comparative coating compositions were also defective in cracking resistance, adhesion, suitability for recoating, etc.

The results further show that in contrast to those comparative compositions, the coating compositions of Examples 1 to 20, which contained any of various rosin compounds in combination with any of solutions $S_1$ to $S_{12}$ of hydrolyzable polymers containing organosilyl ester groups, gave coating films which were free from the formation of a residue layer thereon over long-term immersion and were satisfactory in all of film erosion rate, antifouling performance, cracking resistance, adhesion, suitability for recoating, and the ability to prevent marine-organism attachment over the out-fitting period. Namely, the results show that the coating compositions according to the present invention combined excellent performances.

As demonstrated above, the coating composition of the present invention is applicable to underwater structures required to be protected from fouling and damage by marine organisms, such as ship bottoms, fishing nets, and cooling water pipes, and is further usable for the sludge diffusion prevention in ocean civil engineering works and for other purposes. The coating film obtained from the composition does not form a residue layer thereon over long-term immersion, and is hence free from physical defects such as cracks and peeling and capable of maintaining a sufficiently high rate of film erosion and preventing the attachment of marine organisms over long. In particular, the coating film has the satisfactory ability to prevent marine-organism attachment over the out-fitting period. The coating film further has satisfactory suitability for recoating.

While the invention has been described in detail and with reference to specific-embodiments thereof, it will be apparent to one skilled in the art that various changes and modifications can be made therein without departing from the spirit and scope thereof.

What is claimed is:

1. A coating composition comprising solid ingredients and solvent, said coating composition comprising, as essential components, (A) at least one rosin compound selected from the group consisting of rosins, rosin derivatives and rosin metal salts;

(B) at least one polymer containing an organosilyl ester group, wherein said at least one polymer is composed of:
  i) a polymer obtained from at least one of monomers M represented by formula (1);
  ii) a polymer obtained from at least one of said monomers M and at least one of polymerizable monomers other than said monomers M; or
  iii) a mixture of the polymers i) and ii),

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and (C) antifoulant, wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition.

2. A coating composition according to claim 1, wherein said at least one polymer containing an organosilyl ester has a weight-average molecular weight of from 1,000 to 150,000.

3. A coating composition according to claim 1, wherein said at least one polymer (B) contains said monomers M in an amount of 1 to 100% by weight and said at least one of polymerizable monomers other than said monomers M in an amount of 99 to 0% by weight.

4. A coating composition according to claim 1, wherein said antifoulant is selected from the group consisting of inorganic compounds, organometallic compounds and metal-free organic compounds.

5. A coating composition according to claim 1, wherein said antifoulant is an inorganic compound.

6. A coating composition according to claim 4, wherein said antifoulant is an inorganic compound selected from the group consisting of copper powder, cuprous oxide, cuprous thiocyanate, copper carbonate, copper chloride, copper sulfate, zinc sulfate, zinc oxide, nickel sulfate and copper-nickel alloys.

7. A coating composition according to claim 1, wherein said antifoulant is an organometallic compound.

8. A coating composition according to claim 4, wherein said antifoulant is an organometallic compound selected from the group consisting of organocopper compounds, organonickel compounds and organozinc compounds.

9. A coating composition according to claim 8, wherein said organometallic compound is selected from the group consisting of oxine copper, copper nonylphenolsulfonate, copper bis(ethylenediamine) bis(dodecylbenzenesulfonate), copper acetate, copper naphthenates, copper bis (pentachlorophenolate)s, copper pyrithione, nickel acetate, nickel dimethyldithiocarbamate, zinc acetate, zinc carbamate, zinc dimethyldithiocarbamate, zinc pyrithione, and zinc ethylenebisdithiocarbamate.

10. A coating composition according to claim 1, wherein said antifoulant is a metal-free organic compound.

11. A coating composition according to claim 4, wherein said antifoulant is a metal-free organic compound selected from the group consisting of N-trihalomethylthiophthalimides, dithiocarbamic acids, N-arylmaleimides, 3-(substituted amino)-1,3-thiazolidine-2, 4-diones, dithiocyano compounds and triazine compounds.

12. A coating composition according to claim 4, wherein said antifoulant is a metal-free organic compound selected from the group consisting of N-trichloromethylthiophthalimide, N-fluorodichloromethylthiophthalimide, bis (dimethylthiocarbamoyl) disulfide, ammonium N-methyldithiocarbamate, ammonium ethylenebis (dithiocarbamate), milneb, N-(2,4,6-trichlorophenyl) maleimide, N-4-tolylmaleimide, N-3-chlorophenylmaleimide, N-(4-n-butylphenyl)maleimide, N-(anilinophenyl)maleimide, N-(2,3-xylyl)maleimide, 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione, 3-(4-dimethylaminobenzylideneamino)-1,3-thiazolidine-2, 4-dione, 3-(2,4-dichlorobenzylidene-amino)-1,3-thiazolidine-2,4-dione, dithiocyanomethane, dithiocyanoethane, 2,5-dithiocyanothiophene, 2-methylthio-4-t-butylamino-6-cyclopropylamino-s-triazine, 2,4,5,6-tetrachloroisophthalonitrile, N,N-dimethyl-N'-dichlorophenylurea, 4,5-dichloro-2-n-octylisothiazolin-3-one, N,N-dimethyl-N'-phenyl (N-fluorodichloromethylthio) sulfamide, tetramethylthiuram disulfide, 3-iodo-2-propynylbutyl carbamate, 2-(methoxycarbonylamino) benzimidazole, 2,3,5,6-tetrachloro-4-(methylsulfonyl) pyridine, diiodomethyl p-tolyl sulfone, phenyl(bispyridine) bismuth dichloride, 2-(4-thiazolyl)benzimidazole, and pyridine triphenylborane.

13. A coating composition according to claim 1, wherein the proportion of said at least one rosin compound to said at least one polymer containing an organosilyl ester group is from 5/99 to 99/5, by weight on a solid basis.

14. An antifouling paint composition comprising solid ingredients and solvent, for use in preventing the attachment of organisms to the surfaces of structures submerged in seawater, said paint composition comprising, as essential components, (A) at least one rosin compound selected from the group consisting of rosins, rosin derivatives and rosin metal salts;

(B) at least one polymer containing an organosilyl ester group, wherein said at least one polymer is composed of:
  i) a polymer obtained from at least one of monomers M represented by formula (1);
  ii) a polymer obtained from at least one of said monomers M and at least one of polymerizable monomers other than said monomers M; or
  iii) a mixture of the polymers i) and ii),

wherein $R^1$, $R^2$ and $R^3$ are the same or different and each represents an alkyl group or an aryl group, and X represents an acryloyloxy group, a methacryloyloxy group, a maleinoyloxy group, a fumaroyloxy group, an itaconoyloxy group or a citraconoyloxy group;

(C) antifoulant for preventing the attachment of organisms to the surfaces of structures submerged in seawater, and (D) pigment, wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the paint composition.

15. A paint composition according to claim 14, wherein the proportion of said at least one rosin compound to said at least one polymer containing an organosilyl ester group is from 5/99 to 99/5, by weight on a solid basis.

16. A paint composition according to claim 14, wherein said antifoulant is present in an amount of from 0.1 to 60% by weight based on the total amount of all solid ingredients in the paint compositions.

* * * * *

(12) REEXAMINATION CERTIFICATE (4540th)
United States Patent
Itoh et al.

(10) Number: US 5,795,374 C1
(45) Certificate Issued: Mar. 5, 2002

(54) COATING COMPOSITION

(75) Inventors: Masayasu Itoh; Shigeo Fukuda; Yoshihisa Kawakami; Yoshiro Matsubara; Yasushi Kawamura; Shigeru Masuoka; Yoshihiro Honda, all of Kanagawa (JP)

(73) Assignee: NOF Corporation, Tokyo (JP)

Reexamination Request:
No. 90/005,868, Nov. 30, 2000

Reexamination Certificate for:
Patent No.: 5,795,374
Issued: Aug. 18, 1998
Appl. No.: 08/839,702
Filed: Apr. 15, 1997

(30) Foreign Application Priority Data

Apr. 17, 1996 (JP) ............................................. 8-095028

(51) Int. Cl.⁷ ............................. C09D 5/16; A01N 55/10
(52) U.S. Cl. ................. 106/16; 106/18.36; 106/218; 106/236; 106/241; 424/78.09; 424/630; 424/632; 424/634; 424/635; 424/637; 424/638; 424/641; 424/646; 514/494; 514/499; 514/500; 514/501; 514/63; 523/122; 523/177
(58) Field of Search ................................. 106/16, 18.36, 106/218, 236, 241; 424/78.09, 630, 632, 634, 635, 637, 638, 641, 646; 523/122, 177; 514/63, 494, 499, 500, 501

(56) References Cited

U.S. PATENT DOCUMENTS

| | | | |
|---|---|---|---|
| 4,385,134 A | 5/1983 | Foscante et al. | 523/177 |
| 4,593,055 A | 6/1986 | Gitlitz et al. | 523/122 |
| 4,962,135 A | 10/1990 | Braeken et al. | 523/122 |
| 5,236,493 A | 8/1993 | Hunter et al. | 106/16 |
| 5,332,431 A | 7/1994 | Yokoi et al. | 106/15.05 |
| 5,436,284 A | 7/1995 | Honda et al. | 523/122 |
| 5,439,511 A | 8/1995 | Tanaka et al. | 106/18.32 |
| 5,439,512 A | 8/1995 | Kamijima et al. | 106/18.32 |

FOREIGN PATENT DOCUMENTS

| | | |
|---|---|---|
| EP | 0364272 | 4/1990 |
| JP | 0718216 | 1/1995 |
| WO | 9114743 | 10/1991 |

OTHER PUBLICATIONS

Patent Abstract of Japan, JP 60–028456, Feb. 1985.

*Primary Examiner*—Helene Klemanski

(57) ABSTRACT

A coating composition comprising a rosin compound, a polymer containing organosilyl ester groups, and an antifoulant as essential components is disclosed. This rosin-based coating composition gives a coating film which forms no residue layer on the surface thereof over long-term immersion, is hence free from physical defects such as cracks and peeling and capable of maintaining a sufficiently high rate of film erosion and preventing the attachment of marine organisms over a long period of time has satisfactory suitability for recoating, and has the satisfactory ability to prevent marine-organism attachment over the out-fitting period.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8, 10, 14 and 16 is confirmed.

Claims 9, 11 and 12 are cancelled.

Claims 13 and 15 are determined to be patentable as amended.

New claims 17–59 are added and determined to be patentable.

13. A coating composition according to claim 1, wherein the proportion of said at least one rosin compound to said at least one polymer containing an organosilyl ester group is from [5/99 to 99/5] *5/95 to 95/5*, by weight on a solid basis.

15. A paint composition according to claim 14, wherein the proportion of said at least one rosin compound to said at least one polymer containing an organosilyl ester group is from [5/99 to 99/5] *5/95 to 95/5*, by weight on a solid basis.

*17. A coating composition comprising solid ingredients and solvent, said coating composition comprising, as essential components,*
  *(A) at least one rosin compound selected from the group consisting of (1) a rosin selected from the group consisting of tall rosin, gum rosin, and wood rosin, (2) a rosin derivative selected from the group consisting of hydrogenated rosin, modified rosin obtained by reacting rosin with maleic anhydride, formylated rosin, and polymerized rosin, and (3) a rosin metal salt selected from the group consisting of zinc rosinate, calcium rosinate, copper rosinate, and magnesium rosinate;*
  *(B) at least one polymer containing an organosilyl ester group, wherein said at least one polymer is composed of:*
    *1) a polymer obtained from at least one monomers M represented by formula (1);*
    *2) a polymer obtained from at least one of said monomers M and at least one of polymerizable monomers other than said monomers M; or*
    *3) a mixture of polymers 1) and 2),*

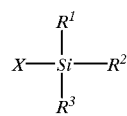
(1)

*wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and*

*(C) an antifoulant;*
*wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition.*

*18. A coating composition comprising solid ingredients and solvent, said coating composition comprising, as essential components.*
  *(A) at least one rosin compound selected from the group consisting of (1) a rosin selected from the group consisting of tall rosin, gum rosin, and wood rosin, (2) a rosin derivative selected from the group consisting of hydrogenated rosin, modified rosin obtained by reacting rosin with maleic anhydride, formylated rosin, and polymerized rosin, and (3) a rosin metal salt selected from the group consisting of zinc rosinate, calcium rosinate, copper rosinate, magnesium rosinate and products of the reaction of rosins with compounds of other metals;*
  *(B) at least one polymer containing an organosilyl ester group, wherein said at least one polymer is composed of:*
    *1) a polymer obtained from at least one monomers M represented by formula (1);*
    *2) a polymer obtained from at least one of said monomers M and at least one of polymerizable monomers other than said monomers M; or*
    *3) a mixture of polymers 1) and 2),*

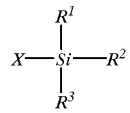
(1)

*wherein $R^1$, $R^2$ and $R^3$ are the same or different and each represents an alkyl group having at least three carbon atoms or an aryl group having at least three carbon atoms; and X represents an acryloyloxy group, a methacryloyloxy group, a maleinoyloxy group, a fumaroyloxy group, an itaconoyloxy group or a citraconoyloxy group; and*

*(C) an antifoulant;*
*wherein the portion of said at least one rosin compound to said at least one polymer containing an oganosilyl ester group is from 1/99 to 99/1, by weight on a solid basis, and wherein said antifoulant is present in an amount of from 0.1 to 80% by weight based on the total amount of all solid ingredients in the coating composition.*

*19. A coating composition comprising solid ingredients and solvent, said coating composition comprising, as essential components,*
  *(A) at least one rosin compound selected from the group consisting of (1) a rosin selected from the group consisting of tall rosin, gum rosin, and wood rosin, (2) a rosin derivative selected from the group consisting of hydrogenated rosin, modified rosin obtained by reacting rosin with maleic anhydride, formylated rosin, and polymerized rosin, and (3) a rosin metal salt selected from the group consisting of zinc rosinate, calcium rosinate, copper rosinate, magnesium rosinate and products of the reaction of rosins with compounds of other metals;*

(B) at least one polymer containing an organosilyl ester group, wherein said at least one polymer is composed of:
1) a polymer obtained from at least one monomers M represented by formula (1);
2) a polymer obtained from at least one of said monomers M and at least one of polymerizable monomers other than said monomers M; or
3) a mixture of polymers 1) and 2),

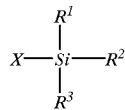
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group, provided that at least two of $R^1$, $R^2$ and $R^3$ have at least three or more carbon atoms; and
(C) an antifoulant;
wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition.

20. A coating composition comprising solid ingredients and solvent, said coating composition comprising, as essential components,
(A) at least one rosin compound selected from the group consisting of (1) a rosin selected from the group consisting of tall rosin, gum rosin, and wood rosin, (2) a rosin derivative selected from the group consisting of hydrogenated rosin, modified rosin obtained by reacting rosin with maleic anhydride, formylated rosin, and polymerized rosin, and (3) a rosin metal salt selected from the group consisting of zinc rosinate, calcium rosinate, and magnesium rosinate;
(B) at least one polymer containing an organosilyl ester group, wherein said at least one polymer is composed of:
1) a polymer obtained from at least one monomers M represented by formula (1);
2) a polymer obtained from at least one of said monomers M and at least one of polymerizable monomers other than said monomers M; or
3) a mixture of polymers 1) and 2),

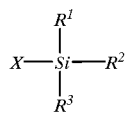
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and
(C) an antifoulant;
wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition.

21. A coating composition comprising solid ingredients and solvent, said coating composition comprising, as essential components,
(A) at least one rosin compound selected from the group consisting of (1) a rosin selected from the group consisting of tall rosin, gum rosin, and wood rosin, and (2) a rosin derivative selected from the group consisting of hydrogenated rosin, modified rosin obtained by reacting rosin with maleic anhydride, formylated rosin, and polymerized rosin;
(B) at least one polymer containing an organosilyl ester group, wherein said at least one polymer is composed of:
1) a polymer obtained from at least one monomers M represented by formula (1);
2) a polymer obtained from at least one of said monomers M and at least one of polymerizable monomers other than said monomers M; or
3) a mixture of polymers 1) and 2),

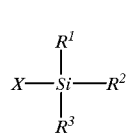
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and
(C) an antifoulant;
wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition.

22. A coating composition comprising solid ingredients and solvent, said coating composition comprising, as essential components,
(A) at least one rosin compound selected from the group consisting of (1) a rosin selected from the group consisting of tall rosin, gum rosin, and wood rosin, (2) a rosin derivative selected from the group consisting of hydrogenated rosin, modified rosin obtained by reacting rosin with maleic anhydride, formylated rosin, and polymerized rosin, and (3) a rosin metal salt selected from the group consisting of zinc rosinate calcium rosinate, and magnesium rosinate;
(B) at least one polymer containing an organosilyl ester group, wherein said at least one polymer is composed of:
1) a polymer obtained from at least one monomers M represeted by formula (1);

2) a polymer obtained from at least one of said monomers M and at least one of polymerizable monomers other than said monomers M; or
3) a mixture of polymers 1) and 2),

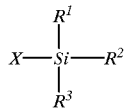
(1)

wherein $R^1$, $R^2$ and $R^3$ each independently represents an alkyl group having three carbon atoms; and X represents an acryloyloxy group, a methacryloyloxy group, a maleinoyloxy group, a fumaroyloxy group, an itaconoyloxy group or a citraconoyloxy group; and (C) an antifoulant;

wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition.

23. An antifouling paint composition comprising solid ingredients and solvent, said paint composition comprising, as essential components, (A) copper rosinate;

(B) at least one polymer containing an organosilyl ester group, wherein said at least one polymer is composed of:
1) a polymer obtained from at least one monomers M represented by formula (1);
2) a polymer obtained from at least one of said monomers M and at least one of polymerizable monomers other than said monomers M; or
3) a mixture of polymers 1) and 2),

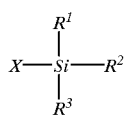
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and (C) cuprous oxide;

wherein the proportion of said copper rosinate to said at least one polymer containing an organosilyl ester group is from 1/99 to 99/1, by weight on a solid basis; said cuprous oxide is present in an amount of from 0.1 to 80% by weight based on the total amount of all solid ingredients in the paint composition; and and an antifouling coating film obtained by coating said paint composition forms no residue layer on the surface thereof over long-term immersion at least up to 24 months, is capable of maintaining a sufficiently high and nearly constant rate of coating film erosion at least up to 24 months, prevents fouling by marine-organism attachment at least up to 24 months, has acceptable adhesion at least up to 24 months, provides acceptable cracking resistance at least up to 24 months, has satisfactory suitability for recoating at least up to 24 months, and prevents marine-organism attachment over an outfitting period at least up to 3 months.

24. An antifouling paint composition comprising solid ingredients and solvent, said paint composition comprising, as essential components, (A) copper rosinate;

(B) at least one polymer containing an organosilyl ester group, wherein said at least one polymer is composed of:
1) a polymer obtained from at least one monomers M represented by formula (1);
2) a polymer obtained from at least one of said monomers M and at least one of polymerizable monomers other than said monomers M; or
3) a mixture of polymers 1) and 2),

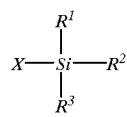
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group, provided that at least two of $R^1$, $R^2$ and $R^3$ have at least three or more carbon atoms; and (C) cuprous oxide, wherein the proportion of said copper rosinate to said at least one polymer containing an organosilyl ester group is from 1/99 to 99/1, by weight on a solid basis; said cuprous oxide is present in an amount of from 0.1 to 80% by weight based on the total amount of all solid ingredients in the paint composition; and and an antifoulign coating film obtained by coating said paint composition forms no residue layer on the surface thereof over long-term immersion at least up to 24 months, is capable of maintaining a sufficiently high and nearly constant rate of coating film erosion at least up to 24 months, prevents fouling by marine-organism attachment at least up to 24 months, has acceptable adhesion at least up to 24 months, provides acceptable cracking resistance at least up to 24 months, has satisfactory suitability for recoating at least up to 24 months, and prevents marine-organism attachment over an outfitting period at least up to 3 months.

25. An antifouling paint composition comprising solid ingredients and solvent, said paint composition comprising, as essential components, (A) copper rosinate;

(B) at least one polymer containing an organosilyl ester group, wherein said at least one polymer is composed of:
1) a polymer obtained from at least one monomers M represented by formula (1);
2) a polymer obtained from at least one of said monomers M and at least one of polymerizable monomers other than said monomers M; or 3) a mixture of polymers 1) and 2),

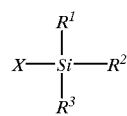
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group, provided that at least two of $R^1$, $R^2$ and $R^3$ have at least three or more carbon atoms; and (C) an antifoulant;

wherein the proportion of said copper rosinate to said at least one polymer containing an organosilyl ester group is from 1/99 to 99/1, by weight on a solid basis; said antifoulant is present in an amount of from 0.1 to 80% by weight based on the total amount of all solid ingredients in the paint composition;

and an antifouling coating film obtained by coating said paint composition forms no residue layer on the surface thereof over long-term immersion at least up to 24 months, is capable of maintaining a sufficiently high and nearly constant rate of coating film erosion at least up to 24 months, prevents fouling by marine-organism attachment at least up to 24 months, has acceptable adhesion at least up to 24 months, provides acceptable crackign resistance at least up to 24 months, has satisfactory suitability for recoating at least up to 24 months, and prevents marine-organism attachment oer an outfitting period at least up to 3 months.

26. An antifouling paint composition comprising solid ingredients and solvent, said paint composition comprising, as essential components, (A) copper rosinate;

(B) at least one polymer containing an organosilyl ester group, wherein said at least one polymer is composed of:

1) a polymer obtained from at least one monomers M represented by formula (1);
2) a polumer obtained from at least one of said monomers M and at least one of polymerizable monomers other than said monomers M; or
3) a mixture of polymers 1) and 2),

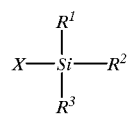
(1)

wherein $R^1$, $R^2$ and $R^3$ are the same or different and each represents an alkyl group or an aryl group; and X represents an acryloyloxy group, a methoacryloyloxy group, a maleinoyloxy group, a fumaroyloxy group, an itaconoyloxy group or a citraconoyloxy group; and (C) an antifoulant;

wherein the proportion of said copper rosinate to said at least one polymer containing an organosilyl ester group is from 1/99 to 99/1, by weight on a solid basis; said antifoulant is present in an amount of from 0.1 to 80% by weight based on the total amount of all solid ingredients in the paint composition;

and an antifouling coating film obtained by coating said paint composition forms no residue layer on the surface thereof over long-term immersion at least up to 24 months, is capable of maintaining a sufficiently high and nearly constant rate of coating film erosion at least up to 24 months, prevents fouling by marine-organism attachment at least up to 24 months, has acceptable adhesion at least up to 24 months, provides acceptable cracking resistance at least up to 24 months, has satisfactory suitability for recoating at least up to 24 months, and prevents marine-organism attachment over an outfitting period at least up to 3 months.

27. An antifouling paint composition comprising:

solid ingredients and solvent, said composition comprising, as essential components, (A) at least one rosin compound selected from the group consisting of rosins, rosin derivatives and rosin metal salts;

(B) at least one polymer containing an organosilyl ester group, wherein said at least one polymer is composed of:

i) a polymer obtained from at least one of monomers M represented by formula (1);
ii) a polymer obtained from at least one of said monomers M and at least one of polymerizable monomers other than said monomers M; or
iii) a mixture of polymers i) and ii),

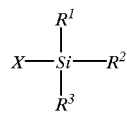
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and (C) antifoulant;

wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition, wherein said antifoulant is an organometallic compound selected from the group consisting of oxine copper, copper nonylphenolsulfonate, copper bis (ethylenediamine) bis(dodecylbenezenesulfonate), copper acetate, copper naphthenates, copper bis (pentachlorophenolate)s, copper pyrithione, nickel acetate, nickel dimethyldithiocarbamate, zinc acetate, zinc carbamate, zinc dimethyldithiocarbamate, zinc pyrithione, and zinc ethylenebisdithiocarbamate.

28. An antifouling paint composition comprising:

solid ingredients and solvent, said composition comprising, as essential components, (A) at least one rosin compound selected from the group consisting of rosins, rosin derivatives and rosin metal salts;

(B) at least one polymer containing an organosilyl ester group, wherein said at least one polymer is composed of:
  i) a polymer obtained from at least one of monomers M represented by forumla (1);
  ii) a polymer obtained from at least one of said monomers M and at least one of polymerizable monomers other than said monomers M; or
  iii) a mixture of polymers i) and ii),

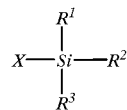
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and (C) antifoulant;
wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition, and wherein said antifoulant is a metal-free organic compound selected from the group consisting of N-trihalomethylthiophthalimides, dithiocarbamic acids, N-arylmaleimides, 3-(substituted amino)-1,3-thiazolidine-2,4-diones, dithiocyano compounds and triazine compounds.

29. An antifouling paint composition comprising:
solid ingredients and solvent, said composition comprising, as essential components,
(A) at least one rosin compound selected from the group consisting of rosins, rosin derivatives and rosin metal salts;
(B) at least one polymer containing an organosilyl ester group,
wherein said at least one polymer is composed of:
  i) a polymer obtained from at least one of monomers M represented by formula (1);
  ii) a polymer obtained from at least one of said monomers M and at least one of polymerizable monomers other than said monomers M; or
  iii) a mixture of polymers i) and ii),

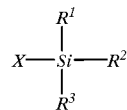
(1)

wherein $R^1$, $R^2$ and $R^3$ are the same or different and each represents an alkyl group or an aryl group; and X represents an acryloyloxy group, a methacryloyloxy group, a maleinoyloxy group, a fumaroyloxy group, an itaconoyloxy group or a citraconoyloxy group; and (C) antifoulant;
wherein the proportion of said at least one rosin compound to said at least one polymer containing an organosilyl ester group is from 1/99 to 99/1, by weight on a solid basis, and wherein said antifoulant is present in an amount of from 0.1 to 80% by weight based on the total amount of all solid ingredients in the coating composition, and wherein said antifoulant is a metal-free organic compound selected from the group consisting of N-trichloromethylthiophthalimide, N-fluorodichloromethylthiophthalimide, bis(dimethylthiocarbamoyl) disulfide, ammonium N-methyldithiocarbamate, ammonium ethylenebis(dithiocarbamate), milneb, N-(2,4,6-trichloropheny)maleimide, N-4-tolymaleimide, N-3-chlorophenylmaleimide, N-(4-n-butylphenyl)malemide, N-(anilinophenyl)maleimide, N-(2,3-xylyl)maleimide, 3-benzylideneamino-1,3-thiazolidine-2,4-dione, 3-(4-methylbenzylideneamino)-1,3-thiazolidine-2,4-dione, 3-(2-hydrorybenzylideneamino)-1,3-thiazolidine-2,4-dione, 3-(4-dimethylaminobenzylideneamino)-1,3-thiazolidine-2,4-dione, 3-(2,4-dichlorobenzylideneamino)-1,3-thiazolidine-2,4-dione, dithiocyanomethane, dithiocyanoethane, 2,5-dithiocyanthiophene, 2-methythio-4-t-butylamino-6-cyclopropylamino-s-triazine, 2,4,5,6-tetrachloroisophthalonitrile, N,N-dimethyl-N'-dichlorophenylurea, 4,5-dichloro-2-n-octylisothiazolin-3-one, N,N-dimethyl-N'-phenyl(N-fluorodichloromethylthio)sulfamide, tetramethylthiuram disulfide, 3-iodo-2-propynylbutyl carbamate, 2-(methoxycarbonylamino)benzimidazole, 2,3,5,6-tetrachloro-4-(methylsulfonyl)pyridine, diiodomethyl p-tolyl sulfone, phenyl(bispyridine)bismuth dichloride, 2-(4-thiazolyl)benzimidazole, and pyridine triphenylborane.

30. The antifouling paint composition according to claim 26, wherein said at least one polymer containing an organosilyl ester has a weight-average molecular weight of from 1,000 to 150,000.

31. The antifouling paint composition according to claim 26, wherein said at least one polymer (B) contains said monomers M in an amount of 1 to 100% by weight and said at least one of polymerizable monomers other than said monomers M in an amount of 99 to 0% by weight.

32. The antifouling paint composition according to claim 26, wherein said antifoulant is selected from the group consisting of inorganic compounds, organometallic compounds and metal-free organic compounds.

33. The antifouling paint composition according to claim 26, wherein said antifoulant is an inorganic compound.

34. The antifouling paint composition according to claim 32, wherein said antifoulant is an inorganic compound selected from the group consisting of copper powder, cuprous oxide, cuprous thiocyanate, copper carbonate, copper chloride, copper sulfate, zinc sulfate, zinc oxide, nickel sulfate and copper-nickel alloys.

35. The antifouling paint composition according to claim 26, wherein said antifoulant is an organometallic compound.

36. The antifouling paint composition according to claim 32, wherein said antifoulant is an organometallic compound selected from the group consisting of organocopper compounds, organonickel compounds and organozinc compounds.

37. The antifouling paint composition according to claim 36, wherein said organometallic compound is selected from the group consisting of oxine copper, copper nonylphenolsulfonate, copper bis(ethylenediamine) bis (dodecylbenzenesulfonate), copper acetate, copper naphthenates, copper bis(pentachlorophenolate)s, copper pyrithione, nickel acetate, nickel dimethyldithiocarbamate, zinc acetate, zinc carbamate, zinc dimethyldithiocarbamate, zinc pyrithione, and zinc ethylenebisdithiocarbamate.

38. The antifouling paint composition according to claim 26, wherein said antifoulant is a metal-free organic compound.

39. The antifouling paint composition according to claim 32, wherein said antifoulant is a metal-free organic compound selected from the group consisting of N-trihalomethylthiophthalimides, dithiocarbamic acids, N-arylmaleimides, 3-(substituted amino)-1,3-thiazolidine-2, 4-diones, dithiocyano compounds and triazine compounds.

40. The antifouling paint composition according to claim 32, wherein said antifoulant is a metal-free organic compound selected from the group consisting of N-trichloromethylthiophthalimide, N-fluorodichloromethylthiophthalimide, bis (dimethylthiocarbamoyl) disulfide, ammonium N-methyldithiocarbamate, ammonium ethylenebis (dithiocarbamate), milneb, N-(2,4,6-trichlorophenyl) maleimide, N-4-tolylmaleimide, N-3-chlorophenylmaleimide, N-(4-n-butylphenyl)maleimide, N-(anilinophenyl)maleimide, N-(2,3-xylyl)maleimide, 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione, 3-(4-dimethylaminobenzylideneamino)-1,3-thiazolidine-2,4-dione, 3-(2,4-dichlorobenzyliden-amino)-1,3-thiazolidine-2, 4-dione, dithiocyanomethane, dithiocyanoethane, 2,5-dithiocyanothiophene, 2-methylthio-4-t-butylamino-6-cyclopropylamino-s-triazine, 2,4,5,6-tetrachloroisophthalonitrile, N,N-dimethyl-N'-dichlorophenylurea, 4,5-dichloro-2-n-octylisothiazolin-3-one, N,N-dimethyl-N'-phenyl (N-fluorodichloromethylthio (sulfamide, tetramethylthiuram disulfide, 3-iodo-2-propynylbutyl carbamate, 2-(methoxycarbonylamino) benzimidazole, 2,3,5,6,-tetrachloro-4-(methylsulfonyl) pyridine, diiodomethyl p-tolyl sulfone, phenyl(bispyridine) bismuth dichloride, 2-(4-thiazolyl)benzimidazole, and pyridine triphenylborane.

41. The antifouling paint composition according to claim 26, wherein the proportion of said copper rosinate to said at least one polymer containing an organosilyl ester group is from 5/95 to 95/5, by weight on a solid basis.

42. The antifouling paint composition according to claim 26, wherein said antifoulant is present in an amount of from 0.1 to 60% by weight based on the total amount of all solid ingredients in the paint composition.

43. The coating composition according to claim 20, wherein said at least one polymer containing an organosilyl ester has a weight-average molecular weight of from 1,000 to 150,000.

44. The coating composition according to claim 20, wherein said at least one polymer (B) contains said monomers M in an amount of 1 to 100% by weight and said at least one of polymerizable monomers other than said monomers M in an amount of 99 to 0% by weight.

45. The coating composition according to claim 20, wherein said antifoulant is selected from the group consisting of inorganic compounds, organometallic compounds and metal-free organic compounds.

46. The coating composition according to claim 20, wherein said antifoulant is an inorganic compound.

47. The coating composition according to claim 45, wherein said antifoulant is an inorganic compound selected from the group consisting of copper powder, cuprous oxide, cuprous thiocyanate, copper carbonate, copper chloride, copper sulfate, zinc sulfate, zinc oxide, nickel sulfate and copper-nickel alloys.

48. The coating composition according to claim 20, wherein said antifoulant is an organometallic compound.

49. The coating compositiong according to claim 45, wherein said antifoulant is an organometallic compound selected from the group consisting of organocopper compounds, organonickel compounds and organozinc compounds.

50. The coating composition according to claim 49, wherein said antifoulant is an organometallic compound is selected from the group consisting of oxine copper, copper nonylphenolsulfonate, copper bis(ethylenediamine) bis (dodecylbenesulfonate), copper acetate, copper naphthenates, copper bis(pentachlorophenolate)s, copper pyrithione, nickel acetate, nickel dimethyldithiocarbamate, zinc acetate, zinc carbamate, zinc dimethyldithiocarbamate, zinc pyrithione, and zinc ethylenebisdithiocarbamate.

51. The coating composition accoridng to claim 20, wherein said antifoulant is a metal-free organic compound.

52. The coating composition according to claim 45, wherein said antifoulant is a metal-free organic compound selected from the group consisting of N-trihalomethylthiophthalimides, dithiocarbamic acids, N-arylmaleimides, 3-(substituted amino)-1,3-thiazolidine-2, 4-diones, dithiocyano compounds and triazine compounds.

53. The coating composition according to claim 45, wherein said antifoulant is a metal-free organic compound selected from the group consisting of N-trichloromethylthiophthalimide, N-fluorodichloromethylthiophthalimide, bis (dimethylthiocarbamoyl) disulfide, ammonium N-methyldithiocarbamate, ammonium ethylenebis (dithiocarbamate), milneb, N-(2,4,6-trichlorophenyl) maleimide, N-4-tolylmaleimide, N-3-chlorophenylmaleimide, N-(4-n-butylphenyl)maleimide, N-(anilinopheynyl)maleimide, N-(2,3-xylyl)maleimide, 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione, 3-(4-dimethylaminobenzylideneamino)-1,3-thiazolidine-2,4-dione, 3-(2,4-dichlorobenzylidene-amino)-1,3-thiazolidine-2,4-dione, dithiocyanomethane, dithiocyanoethane, 2,5-dithiocyanothiophene, 2-methylthio-4-t-butylamino-6-cyclopropylamino-s-triazine, 2,4,5,6-tetrachloroisophthalonitrile, N,N-dimethyl-N'-dichlorophenylurea, 4,5-dichloro-2-n-octylisothiazolin-3-one, N,N-dimethyl-N'-phenyl(N-fluorodichloromethylthio) sulfamide, tetramethylthiuram disulfide, 3-iodo-2-propynylbutyl carbamate, 2-(methoxycarbonylamino) benzimidazole, 2,3,5,6-tetrachloro-4-(methylsulfonyl) pyridine, diiodomethyl p-tolyl sulfone, phenyl(bispyridine) bismuth dichloride, 2-(4-thiazolyl)benzimidazole, and pyridine triphenylborane.

54. The coating composition according to claim 20, wherein the proportion of said at least one rosin compound to said at least one polymer containing an organosilyl ester group is from 5/95 to 95/5, by weight on a solid basis.

55. The coating composition according to claim 20, wherein said antifoulant is present in an amount of 0.1 to 60% by weight based on the total amount of all solid ingredients in the composition.

56. The antifouling paint composition according to claim 23, wherein said at least one polymer containing an organosilyl ester has a weight-average molecular weight of from 1,000 to 150,000.

57. The antifouling paint composition according to claim 23, wherein said at least one polymer (B) contains said monomers M in an amount of 1 to 100% by weight and said at least one of polymerizable monomers other than said monomers M in an amount of 99 to 0% by weight.

58. The antifouling paint composition according to claim 23, wherein the proportion of said at least one rosin compound to said at least one polymer containing an organosilyl ester group is from 5/95 to 95/5, by weight on a solid basis.

59. The antifouling paint composition according to claim 23, wherein said antifoulant is present in an amount of from 0.1 to 60% by weight based on the total amount of all solid ingredients in the paint composition.

* * * * *